United States Patent
Nakanishi et al.

(10) Patent No.: US 9,267,455 B2
(45) Date of Patent: Feb. 23, 2016

(54) WORK VEHICLE AND WORK VEHICLE CONTROL METHOD

(75) Inventors: Yukihiro Nakanishi, Hiratsuka (JP); Satoshi Fukuhara, Hiratsuka (JP); Yasunori Ohkura, Kawasaki (JP)

(73) Assignee: KOMATSU LTD., Tokyo (JP)

( * ) Notice: Subject to any disclaimer, the term of this patent is extended or adjusted under 35 U.S.C. 154(b) by 172 days.

(21) Appl. No.: 13/577,803

(22) PCT Filed: Feb. 9, 2011

(86) PCT No.: PCT/JP2011/052687
§ 371 (c)(1),
(2), (4) Date: Aug. 8, 2012

(87) PCT Pub. No.: WO2011/118272
PCT Pub. Date: Sep. 29, 2011

(65) Prior Publication Data
US 2012/0310495 A1 Dec. 6, 2012

(30) Foreign Application Priority Data
Mar. 24, 2010 (JP) .................................. 2010-068327

(51) Int. Cl.
*B60W 50/00* (2006.01)
*F02D 41/02* (2006.01)
(Continued)

(52) U.S. Cl.
CPC ......... *F02D 41/022* (2013.01); *B60W 30/1882* (2013.01); *E02F 9/2066* (2013.01); *E02F 9/2246* (2013.01); *E02F 9/2253* (2013.01); *E02F 9/2292* (2013.01); *B60W 10/06* (2013.01); *B60W 2300/17* (2013.01);
(Continued)

(58) Field of Classification Search
CPC ..... E02F 9/2066; E02F 9/2246; E02F 9/2253; E02F 9/2292; B60W 2300/17; B60W 2510/0233; F02D 41/022
USPC .............................. 701/1, 50; 477/64, 111, 70
See application file for complete search history.

(56) References Cited

U.S. PATENT DOCUMENTS 7,195,581 B2 * 3/2007 Segawa et al. ................. 477/180
2006/0276948 A1 * 12/2006 Toda ............................... 701/50
(Continued)

FOREIGN PATENT DOCUMENTS

| JP | 2007-107651 A | 4/2007 |
| JP | 2009-030575 A | 2/2009 |
| JP | 2009-103258 A | 5/2009 |

OTHER PUBLICATIONS

International Search Report of corresponding PCT Application No. PCTI2011/052687.

*Primary Examiner* — Nga X Nguyen
(74) *Attorney, Agent, or Firm* — Global IP Counselors, LLP

(57) ABSTRACT

In a work vehicle, a controller controls an engine based on an engine torque curve for defining a relationship between an engine speed, an engine output torque, and an operation amount of an accelerator operation member. The controller controls the engine based on a first engine torque curve during torque conversion travel. The controller controls the engine based on a second engine torque curve during lockup travel. The engine output torque of the second engine torque curve is less than the engine output torque of the first engine torque curve in at least a portion of a range of the engine speed when at least the operation amount of the accelerator operation member is a predetermined operation amount that is less than a maximum operation amount.

6 Claims, 21 Drawing Sheets

(51) Int. Cl.
*E02F 9/20* (2006.01)
*E02F 9/22* (2006.01)
*B60W 30/188* (2012.01)
*F02D 29/00* (2006.01)
*B60W 10/06* (2006.01)

(52) U.S. Cl.
CPC ... *B60W 2300/50* (2013.01); *B60W 2510/0233* (2013.01); *F02D 29/00* (2013.01); *F02D 2200/501* (2013.01); *F02D 2200/602* (2013.01); *F02D 2250/18* (2013.01)

(56) References Cited

U.S. PATENT DOCUMENTS

2009/0036270 A1* 2/2009 Hayashi et al. ............... 477/181
2009/0247356 A1* 10/2009 Hatanaka ...................... 477/64

* cited by examiner (a)

(b)

(a)

(b)

WORK VEHICLE AND WORK VEHICLE CONTROL METHOD

CROSS-REFERENCE TO RELATED APPLICATIONS

This application claims priority to Japanese Patent Application No. 2010-068327 filed on Mar. 24, 2010, the disclosure of which is hereby incorporated herein by reference in its entirety.

TECHNICAL FIELD

The present invention relates to a work vehicle and a method for controlling a work vehicle.

BACKGROUND ART

There are wheel loaders and other work vehicles that comprise a torque converter device having a torque converter and a lockup clutch. The torque converter device transmits the drive force from the engine to the travel device via the torque converter when the lockup clutch is in a non-connected state (this state is hereinafter referred to as "torque conversion travel"). When the lockup clutch is in a connected state, the torque converter device transmits the drive force from the engine to the travel device via the lockup clutch (this state is hereinafter referred to as "lockup travel"). Switching the lockup clutch between the connected state and the non-connected state is automatically carried out by a controller. The controller switches the lockup clutch between the connected state and the non-connected state when, e.g., the vehicle speed reaches a predetermined switch speed (see Japanese Laid-open Patent Application No. 2009-103258).

SUMMARY

In a work vehicle such as that described above, the controller controls the engine on the basis of an engine torque curve. In a conventional work vehicle, the engine is controlled on the basis of the same engine torque curve whether the lockup clutch is in a connected state or a non-connected state. However, the traction force of the vehicle during lockup travel (see the broken line F50 of FIG. 10(c)) is greater than the traction force during torque conversion travel (see the dot-dash line F2TC50 of FIG. 10(c)). Accordingly, the traction force may sharply increase immediately after the lockup clutch has been switched from the non-connected state to the connected state (see the broken line arrow of FIG. 10(c)). In this case, a phenomenon occurs in which the vehicle speed increases immediately after the lockup clutch has been switched from the non-connected state to the connected state, as shown by the solid line L1 in FIG. 23. In FIG. 23, the lockup clutch is switched from the non-connected state to the connected state at time t1. In other words, a switch is made at time t1 from torque conversion travel to lockup travel. Such an increase in vehicle speed is unintended by the operator and is unnecessary. Also, since fuel commensurate to the increase in vehicle speed is consumed, such a phenomenon leads to reduced fuel economy.

The work vehicle sometimes performs work in which stopping and starting are repeated, such as when soil or the like is excavated and loaded. When a phenomenon such as that described above occurs repeatedly during such work, the operator will perceive a reduction in ease of operation. Accordingly, the operator operates a switch or the like to nullify lockup clutch-switching control by the controller in order to avoid a phenomenon such as that described above. Therefore, even though the effect of reducing fuel consumption is greater than in torque conversion travel, the reality is that lockup travel during work as described above is not effectively used.

An object of the present invention is to inhibit an increase in vehicle speed immediately after the lockup clutch has been switched from the non-connected state to the connected state, and to improve fuel economy.

The work vehicle according to a first aspect of the present invention comprises an engine, a travel device, a hydraulic pump, a work implement, a torque converter device, an accelerator operation member, an accelerator operation detector, and a controller. The travel device is driven by a drive force from the engine and causes the vehicle to travel. The hydraulic pump is driven by the drive force from the engine and discharges hydraulic fluid. The work implement is driven by hydraulic fluid from the hydraulic pump. The torque converter device has a torque converter and a lockup clutch, and transmits the drive force from the engine to the travel device. The accelerator operation member is operated by an operator. The accelerator operation detector detects the operation amount of the accelerator operation member. The controller is configured to control the engine on the basis of an engine torque curve for defining a relationship between the engine speed, the engine output torque, and the operation amount of the accelerator operation member. The controller is configured to control the engine on the basis of a first engine torque curve during torque conversion travel in which the lockup clutch is in a non-connected state. The controller is configured to control the engine on the basis of a second engine torque curve during lockup travel in which the lockup clutch is in a connected state. The engine output torque of the second engine torque curve is less than the engine output torque of the first engine torque curve in at least a portion of the range of the engine speed when at least the operation amount of the accelerator operation member is a predetermined operation amount that is less than a maximum operation amount.

In this work vehicle, the difference between the traction force produced by the engine output torque in the engine torque curve during torque conversion travel and the traction force produced by the engine output torque in the engine torque curve during lockup travel is small. It is therefore possible to inhibit an increase in vehicle speed immediately after a switch is made from torque conversion travel to lockup travel. Fuel economy can thereby be improved. Fuel economy can also be improved by the effective use of lockup travel because a reduction in ease of operation is inhibited.

The work vehicle according to a second aspect of the present invention is the work vehicle according to the first aspect, wherein the engine output torque of the second engine torque curve is less than the engine output torque of the first engine torque curve in a predetermined speed range that includes a switch speed at which a switch is made from the torque conversion travel to the lockup travel.

In this work vehicle, the difference between the traction force during torque conversion travel and the traction force during lockup travel is small when a switch is made from torque conversion travel to lockup travel. Accordingly, it is possible to inhibit a shock produced in the vehicle when a switch is made from torque conversion travel to lockup travel.

The work vehicle according to a third aspect of the present invention is the work vehicle according to the first aspect of the present invention, wherein the engine output torque of the second engine torque curve increases or decreases in accordance with an increase or decrease in the operation amount of the accelerator operation member in at least a portion of the range of the engine speed.

In this work vehicle, the intention of the operator via the operation amount of the accelerator operation member is reflected in the reduction of the engine output torque. Accordingly, it is possible to inhibit the operator from perceiving a reduction in ease of operation because the engine output torque is reduced and a rapid increase in the vehicle speed is inhibited. Also, the torque reduction amount is enhanced in operating conditions in which the operator does not perceive a reduction in ease of operation, whereby fuel economy can be further improved.

The work vehicle according to a fourth aspect of the present invention is the work vehicle according to the first aspect of the present invention, further comprising a maximum speed stage setting member operated by the operator. The travel device has a transmission. The controller automatically changes gears of the transmission in a range equal to or less than the maximum speed stage selected by the maximum speed stage setting member. The controller is configured to control the engine on the basis of different second engine torque curves in the case that the maximum speed stage selected by the maximum speed stage setting member is different, even when the actual speed stage of the transmission is the same speed stage.

In this work vehicle, the intention of the operator via the operation of the maximum speed stage setting member is reflected in the reduction of the engine output torque. Accordingly, it is possible to inhibit the operator from perceiving a reduction in ease of operation because the engine output torque is reduced and a rapid increase in the vehicle speed is inhibited. Also, the torque reduction amount is enhanced in operating conditions in which the operator does not perceive a reduction in ease of operation, whereby fuel economy can be further improved.

The work vehicle according to a fifth aspect of the present invention is the work vehicle according to the first aspect of the present invention, wherein the engine output torque of the second engine torque curve when the operation amount of the accelerator operation member is maximum is less than the engine output torque of the first engine torque curve in at least a portion of the range of the engine speed In this work vehicle, an increase in the vehicle speed immediately after a switch from torque conversion travel to lockup travel is inhibited even when the operation amount of the accelerator operation member is at maximum Fuel economy can thereby be improved.

The work vehicle according to a sixth aspect of the present invention is the work vehicle according to any of the first to fifth aspects, wherein the controller is configured to determine whether load increase conditions that lead to an increase in work implement load or travel load are satisfied. The controller is configured to control the engine on the basis of a third engine torque curve during lockup travel when the load increase conditions are satisfied. The third engine torque curve has an engine output torque that is greater than the second engine torque curve in at least a portion of the range of the engine speed.

In this work vehicle, the engine is controlled on the basis of the third engine torque curve during lockup travel in conditions in which the work vehicle load or the travel load increases. The engine output torque of the third engine torque curve is greater than the second engine torque curve in at least a portion of the range of the engine speed. Accordingly, the engine output torque when the engine is controlled on the basis of the third engine torque curve is greater than the engine output torque when the engine is controlled on the basis of the second engine torque curve. It is thereby possible to inhibit a reduction in the ease of operation of the work implement or the travel characteristics of the travel device in conditions in which the load on the work vehicle increases.

The method for controlling a work vehicle according to a seventh aspect of the present invention is a method for controlling a work vehicle that comprises an engine, a travel device, a hydraulic pump, a work implement, a torque converter device, and an accelerator operation member. The travel device is driven by a drive force from the engine and causes the vehicle to travel. The hydraulic pump is driven by the drive force from the engine and discharges hydraulic fluid. The work implement is driven by hydraulic fluid from the hydraulic pump. The torque converter device has a torque converter and a lockup clutch, and transmits the drive force from the engine to the travel device. The accelerator operation member is a member operated by an operator. This control method comprises the following steps: a step for detecting the operation amount of the accelerator operation member; and a step for controlling the engine on the basis of an engine torque curve that defines the relationship between the engine speed, the engine output torque, and the operation amount of the accelerator operation member. Also, in the step for controlling the engine on the basis of the engine torque curve, the engine is controlled on the basis of a first engine torque curve during torque conversion travel in which the lockup clutch is in a non-connected state, and the engine is controlled on the basis of a second engine torque curve during lockup travel in which the lockup clutch is in a connected state. The engine output torque of the second engine torque curve is less than the engine output torque of the first engine torque curve in at least a portion of the range of the engine speed when at least the operation amount of the accelerator operation member is a predetermined operation amount which is less than a maximum operation amount.

In this method for controlling a work vehicle, the difference between the traction force produced by the engine output torque in the engine torque curve during torque conversion travel and the traction force produced by the engine output torque in the engine torque curve during lockup travel is small. It is therefore possible to inhibit an increase in vehicle speed immediately after a switch is made from torque conversion travel to lockup travel. Fuel economy can thereby be improved. Fuel economy can also be improved by the effective use of lockup travel because a reduction in ease of operation is inhibited.

In accordance with the present invention, the vehicle speed is inhibited from increasing immediately after the lockup clutch has been switched from the non-connected state to the connected state, and fuel economy can be improved.

DESCRIPTION OF EMBODIMENTS

Figure 1:
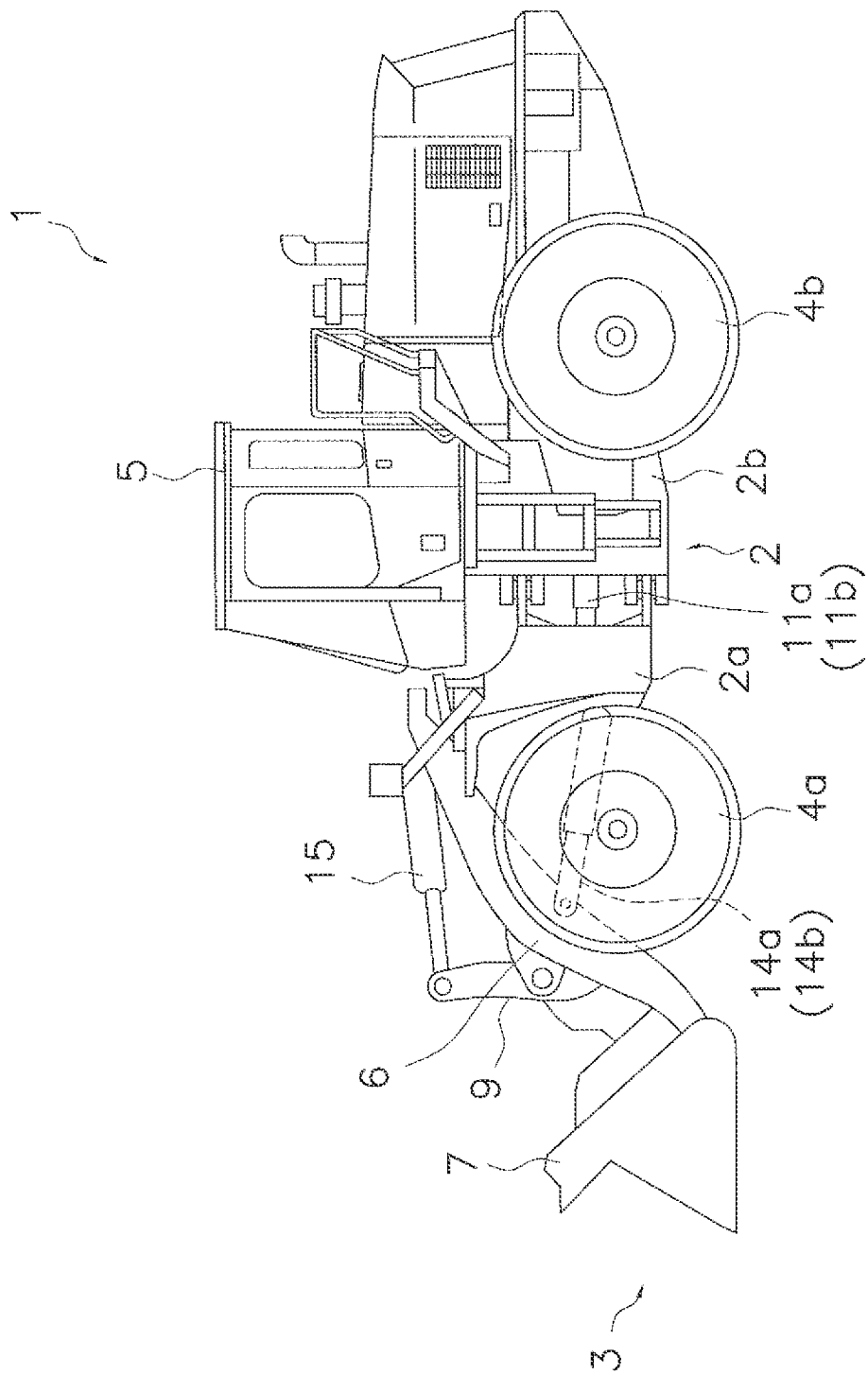
FIG. 1 is a side view of the work vehicle according to an embodiment of the present invention.
Figure 2:
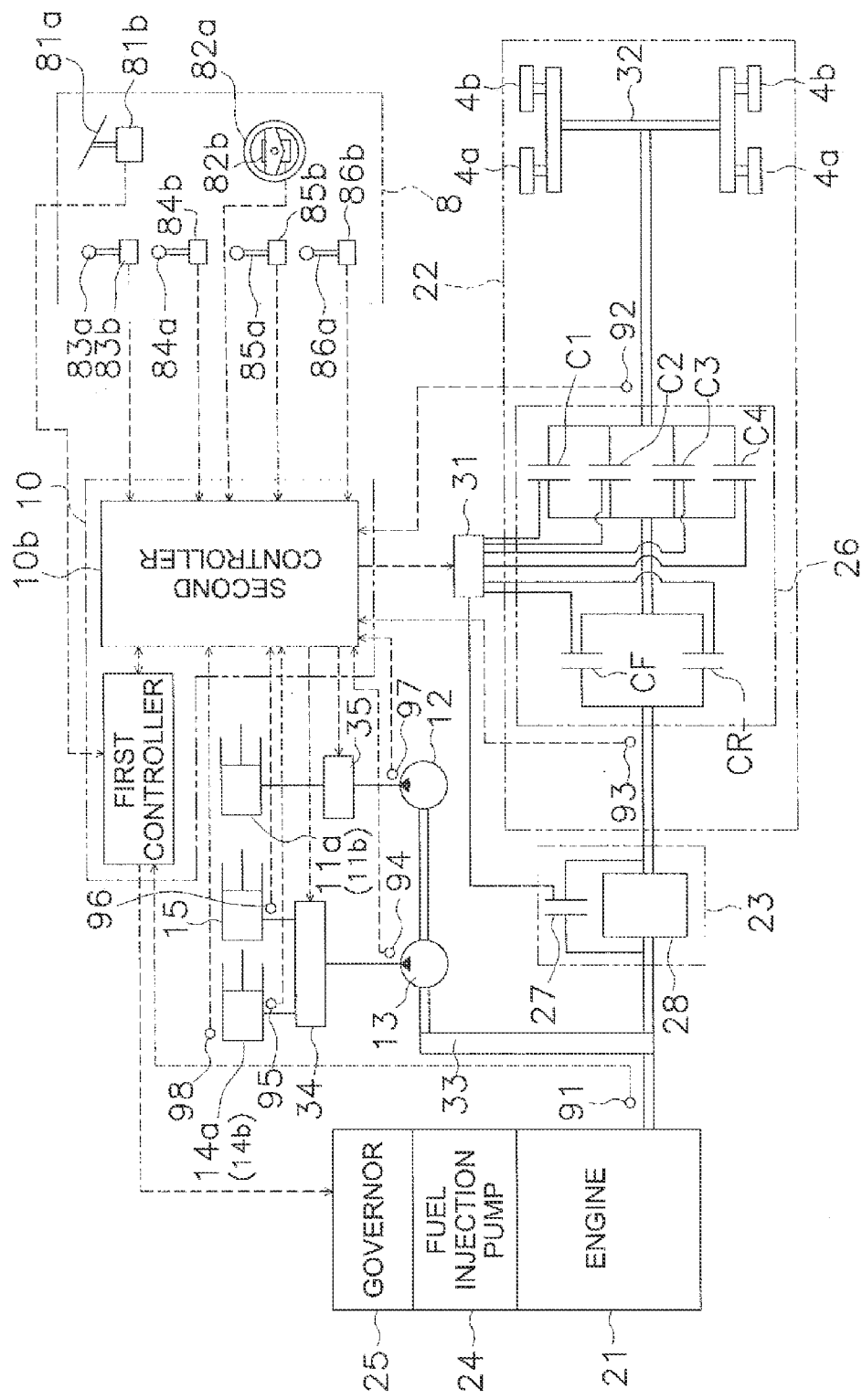
FIG. 2 is a schematic view showing the configuration of the work vehicle.

The work vehicle 1 according to an embodiment of the present invention is shown in FIGS. 1 and 2. FIG. 1 is a view of the external appearance of the work vehicle 1, and FIG. 2 is a schematic view showing the configuration of the work vehicle 1. The work vehicle 1 is a wheel loader, and the work vehicle 1 is capable of traveling by front wheels 4a and rear wheels 4b being rotatably driven, and is capable performing desired work using a work implement 3.

The work vehicle 1 comprises a vehicle body frame 2, a work implement 3, front wheels 4a, rear wheels 4b, and a driver cabin 5, as shown in FIG. 1.

The vehicle body frame 2 has a front vehicle body section 2a and a rear vehicle body section 2b. The front vehicle body section 2a and the rear vehicle body section 2b are connected to each other so as to allow pivoting in the left and right directions. A pair of steering cylinders 11a and 11b are provided from the front vehicle body section 2a to the rear vehicle body section 2b. The steering cylinders 11a and 11b are hydraulic cylinders driven by hydraulic fluid from a steering pump 12 (see FIG. 2). The steering cylinders 11a and 11b expand and contract, whereby the front vehicle body section 2a pivots in relation to the rear vehicle body section 2b. The direction of progress of the vehicle is thereby changed. In FIGS. 1 and 2, only one of the steering cylinders 11a and 11b is shown, and the other is omitted.

The work implement 3 and the pair of front wheels 4a are attached to the front vehicle body section 2a. The work implement 3 is driven by the hydraulic fluid from the work implement pump 13 (see FIG. 2). The work implement 3 has a boom 6, a pair of lift cylinders 14a and 14b, a bucket 7, a bucket cylinder 15, and a bell crank 9. The boom 6 is mounted on the front vehicle body section 2a. One end of the lift cylinders 14a is attached to the front vehicle body section 2a. The other end of the lift cylinders 14a is attached to the boom 6. One end of the lift cylinders 14b is attached to the front vehicle body section 2a. The other end of the lift cylinders 14b is attached to the boom 6. The lift cylinders 14a and 14b are caused to expand and contract by hydraulic fluid from the work implement pump 13, whereby the boom 6 vertically pivots. In FIGS. 1 and 2, only one of the lift cylinders 14a and 14b is shown, and the other is omitted. The bucket 7 is attached to the distal end of the boom 6. One end of the bucket cylinder 15 is attached to the front vehicle body section 2a. The other end of the bucket cylinder 15 is attached to the bucket 7 via a bell crank 9. The bucket cylinder 15 is caused to expand and contract by hydraulic fluid from the work implement pump 13, whereby the bucket 7 vertically pivots.

The driver cabin 5 and the pair of rear wheels 4b are attached to the rear vehicle body section 2b. The driver cabin 5 is disposed above the vehicle body frame 2, and houses a seat on which an operator sits, and/or a later-described operation unit 8, and the like.

The work vehicle 1 comprises an engine 21, a torque converter device 23, a travel device 22, a work implement pump 13, a steering pump 12, the operation unit 8, a controller 10, and the like, as shown in FIG. 2.

The engine 21 is a diesel engine, and the fuel amount injected into the cylinder is adjusted to control the output of the engine 21. This adjustment is made by a later-described first controller 10a, which controls an electronic governor 25 provided to a fuel injection pump 24 of the engine 21. A general all-speed control governor is used as the governor 25, and the engine speed and fuel injection amount are adjusted in accordance with a load so that the engine speed achieves a target speed that corresponds to a later-described accelerator operation amount. In other words, the governor 25 increases or reduces the fuel injection amount so that there is no deviation between a target engine speed and the actual engine speed. The engine speed is detected by an engine speed sensor 91. The detection signal of the engine speed sensor 91 is inputted to the first controller 10a.

The torque converter device 23 has a lockup clutch 27 and a torque converter 28. The lockup clutch 27 can be switched between a connected state and a non-connected state. The torque converter 28 transmits the drive force from the engine 21 using oil as a medium to the travel device 22 when the lockup clutch 27 is in a non-connected state (this state is hereinafter referred to as "torque conversion travel"). The input side and the output side of the torque converter 28 are directly connected when the lockup clutch 27 is in a connected state. The drive force from the engine 21 is transmitted to the travel device 22 via the lockup clutch 27 (this state is hereinafter referred to as "lockup travel"). The lockup clutch 27 is a hydraulic pressure-actuated clutch, and the feeding of hydraulic fluid to the lockup clutch 27 is controlled by a later-described second controller 10b via a clutch control valve 31 to thereby switch between the connected state and the non-connected state.

The travel device 22 is a device for causing the vehicle to travel by the drive force from the engine 21. The travel device 22 has a transmission 26, the above-described front wheels 4a and rear wheels 4b, and the like.

The transmission 26 has a forward clutch CF adapted for forward travel stages and a reverse clutch CR adapted for reverse travel stages. The clutches CF, CR are switched between the connected state and the non-connected state to thereby switch the vehicle between forward and reverse. The vehicle is in a neutral state when the clutches CF and CR are both in the non-connected state. The transmission 26 has a plurality of speed stage clutches C1 to C4 adapted for a plurality of speed stages, and can switch the reduction gear ratio to a plurality of levels. For example, in the transmission 26, four speed stage clutches C1 to C4 are provided, and the speed stages can be switched to four levels, i.e., first speed stage to fourth speed stage. The speed stage clutches C1 to C4 are hydraulic pressure-actuated hydraulic clutches. Hydraulic fluid is fed from a hydraulic pump (not shown) to the clutches C1 to C4 via the clutch control valve 31. The clutch control valve 31 is controlled by the second controller 10b, and the feeding of the hydraulic fluid to the clutches C1 to C4 is controlled, whereby the connected state and non-connected state of the clutches C1 to C4 are switched.

A transmission output speed sensor 92 for detecting the rotational speed of the output shaft of the transmission 26 is provided to the output shaft of the transmission 26. Detection signals from the transmission output speed sensor 92 are inputted to the second controller 10b. The second controller 10b calculates the vehicle speed on the basis of the detection signals of the transmission output speed sensor 92. Therefore, the transmission output speed sensor 92 functions as a vehicle speed detector for detecting the vehicle speed. A sensor for detecting the rotational speed of other components may be used as a vehicle speed detector in lieu of the output shaft of the transmission 26. The drive force outputted from the transmission 26 is transmitted to the front wheels 4a and the rear wheels 4b via a shaft 32, or the like, whereby the vehicle travels. The rotational speed of the input shaft of the transmission 26 is detected by a transmission input speed sensor 93. The detection signals from the transmission input speed sensor 93 are inputted to the second controller 10b.

A portion of the drive force of the engine 21 is transmitted to the steering pump 12 and the work implement pump 13 via a PTO shaft 33. The work implement pump 13 and the steering pump 12 are hydraulic pumps driven by drive force from the engine 21. The hydraulic fluid discharged from the work implement pump 13 is fed to the lift cylinders 14a and 14b and the bucket cylinder 15 via a work implement control valve 34. The hydraulic fluid discharged from the steering pump 12 is fed to the steering cylinders 11a and 11b via a steering control valve 35. In this manner, the work implement 3 and the steering cylinders 11a and 11b are driven by a portion of the drive force from the engine 21.

The pressure of the hydraulic fluid discharged from the work implement pump 13 (hereinafter referred to as "hydraulic pressure of the work implement pump") is detected by a first hydraulic pressure sensor 94. The pressure of the hydraulic fluid fed to the lift cylinders 14a and 14b (hereinafter referred to as "lift cylinder hydraulic pressure") is detected by a second hydraulic pressure sensor 95. Specifically, the second hydraulic pressure sensor 95 detects the hydraulic pressure in the cylinder bottom chamber to which hydraulic fluid is fed when the lift cylinders 14a and 14b are extended. The pressure of the hydraulic fluid fed to the bucket cylinder 15 (hereinafter referred to as "hydraulic pressure of the bucket cylinder") is detected by a third hydraulic pressure sensor 96. Specifically, the third hydraulic pressure sensor 96 detects the hydraulic pressure of the cylinder bottom chamber to which hydraulic fluid is fed when the bucket cylinder 15 is extended. The pressure of the hydraulic fluid discharged from the steering pump 12 (hereinafter referred to as "hydraulic pressure of the steering pump") is detected by a fourth hydraulic pressure sensor 97. The detection signals from the first to fourth hydraulic pressure sensors 94 to 97 are inputted to the second controller 10b.

The operation unit 8 is operated by the operator. The operation unit 8 has an accelerator operation member 81a, an accelerator operation detection device 81b, a steering operation member 82a, a steering operation detection device 82b, a boom operation member 83a, a boom operation detection device 83b, a bucket operation member 84a, a bucket operation detection device 84b, a gear shift operation member 85a, a gear shift operation detection device 85b, an FR operation member 86a, an FR operation detection device 86b, and the like.

The accelerator operation member 81a is, e.g., an accelerator pedal, and is operated in order to set the target speed of the engine 21. The accelerator operation detection device 81b (accelerator operation detector) detects the operation amount of the accelerator operation member 81a (hereinafter referred to as "accelerator operation amount"). The accelerator operation detection device 81b outputs the detection signal to the first controller 10a.

The steering operation member 82a is, e.g., a steering wheel, and is operated in order to operate the direction of progress of the vehicle. The steering operation detection device 82b detects the position of the steering operation member 82a and outputs detection signals to the second controller 10b. The second controller 10b controls the steering control valve 35 on the basis of detection signals from the steering operation detection device 82b. The steering cylinders 11a and 11b thereby expand and contract, and the direction of progress of the vehicle is changed.

The boom operation member 83a and the bucket operation member 84a are, e.g., operation levers, and are operated in order to actuate the work implement 3. Specifically, the boom operation member 83a is operated in order to actuate the boom 6. The bucket operation member 84a is operated in order to actuate the bucket 7. The boom operation detection device 83b detects the position of the boom operation member 83a. The bucket operation detection device 84b detects the position of the bucket operation member 84a. The boom operation detection device 83b and the bucket operation detection device 84b output detection signals to the second controller 10b. The second controller 10b controls the work implement control valve 34 on the basis of detection signals from the boom operation detection device 83b and the bucket operation detection device 84b. The lift cylinders 14a and 14b and the bucket cylinder 15 thereby expand and contract and the boom 6 and the bucket 7 are actuated. Also, a boom angle detection device 98 for detecting the boom angle is provided to the work implement 3. The boom angle is, e.g., the angle between the line connecting the axial centers of the front and rear wheels 4a and 4b, and the line connecting the center of rotational support of the front vehicle body section 2a and the boom 6 and the center of rotational support of the boom 6 and the bucket 7. The boom angle detection device 98 outputs detection signals to the second controller 10b.

The gear shift operation member 85a is, e.g., a shift lever. The gear shift operation member 85a is operated in order to set an upper limit of the speed stage (hereinafter referred to as "maximum speed stage"). The gear shift operation detection device 85b detects the position of the gear shift operation member 85a. The gear shift operation detection device 85b outputs detection signals to the second controller 10b. The second controller 10b controls the gear shifting of the transmission 26 on the basis of the detection signals from the gear shift operation detection device 85b.

The FR operation member 86a is operated in order to switch the vehicle between forward and reverse. The FR operation member 86a can be switched to forward, neutral, and reverse positions. The FR operation detection device 86b detects the position of the FR operation member 86a. The FR operation detection device 86b outputs detection signals to the second controller 10b. The second controller 10b controls the clutch control valve 31 on the basis of the detection signals from the FR operation detection device 86b. The forward clutch CF and the reverse clutch CR are thereby controlled to switch the vehicle between forward, reverse, and neutral states.

The controller 10 has the first controller 10a and the second controller 10b. Each of the first controller 10a and the second controller 10b can be implemented in the form of a computer having a storage device used as, e.g., program memory and/or work memory, and a CPU for executing a program.

Figure 3:
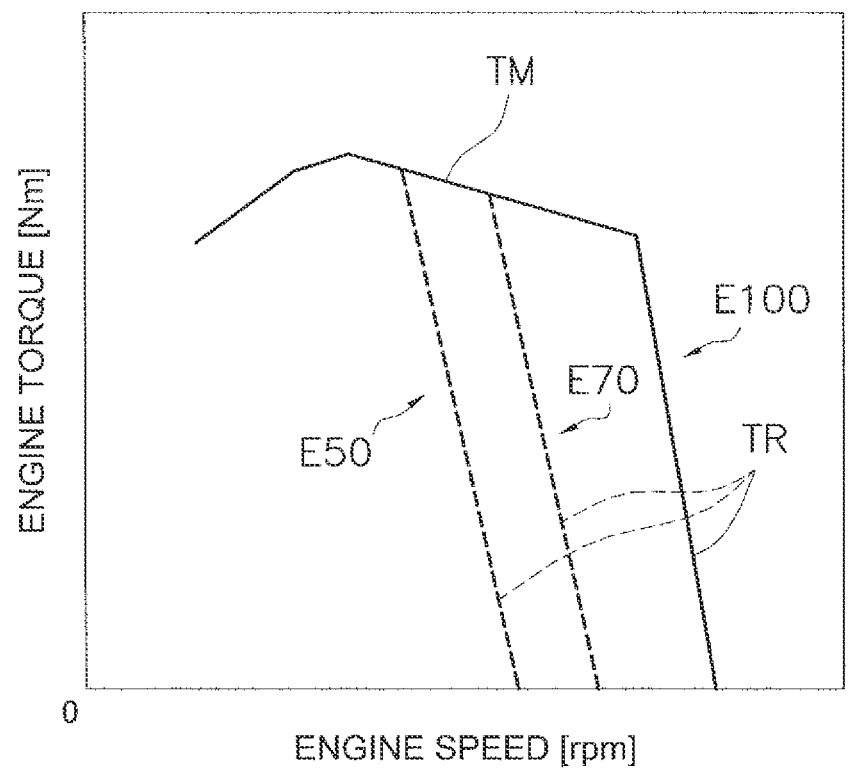
FIG. 3 is a diagram showing examples of the first engine torque curve.

The first controller 10a sends engine command signals to the governor 25 so as to achieve a target engine speed that corresponds to the accelerator operation amount. The engine 21 is controlled on the basis of the engine torque curve for defining the relationship between the engine speed, the engine output torque of the engine 21 (hereinafter referred to as "engine torque"), and the accelerator operation amount. More specifically, the engine torque curve represents the maximum output torque (hereinafter referred to as "torque upper limit value") that the engine 21 is capable of outputting in accordance with the engine speed. The engine torque curve is changed according to the accelerator operation amount. The engine torque curves E100, E70, E50 shown FIG. 3 are examples of the engine torque curve when later-described engine torque reduction control is not be performed. The first engine torque curve E100 is the engine torque curve when the accelerator operation amount is 100%. The first engine torque curve E100 corresponds to, e.g., the rated or maximum power output of the engine 21. The 100% accelerator operation amount refers to the state in which the accelerator operation member 81a is maximally operated. The first engine torque curve E70 indicates the engine torque curve when the accelerator operation amount is 70%. The first engine torque curve E50 indicates the engine torque curve when the accelerator operation amount is 50%. In this manner, in the first engine torque curves E100, E70, E50, the characteristic TR of the engine torque in the regulation region before the fuel injection amount of the governor 25 becomes maximum varies in accordance with the accelerator operation amount. However, the characteristic TM of the engine torque in all load regions in which the fuel injection amount of the governor 25 becomes maximum does not vary in accordance with accelerator operation amount.

The governor 25 controls the output of the engine 21 so that the engine torque becomes equal to or less than the engine torque curve. The control of the output of the engine 21 is carried out by, e.g., controlling the upper limit value of fuel injection amount to the engine 21. When engine torque reduction control is being performed, the first controller 10a receives a correction command signal from the second controller 10b. The first controller 10a corrects the command value of the engine command signal using the correction command signal, and sends the corrected command value to the governor 25.

The second controller 10b controls the transmission 26, the torque converter device 23, and the like in accordance with the travel state of the vehicle. The second controller 10b automatically changes the speed of the transmission 26 and switches the lockup clutch 27 in accordance with the vehicle speed. Specifically, gears are changed in the sequence of second speed torque conversion travel, second speed lockup travel, third speed torque conversion travel, third speed lockup travel, fourth speed torque conversion travel, and fourth speed lockup travel, in accordance with the increase in vehicle speed. For example, second speed torque conversion travel refers to a power-transmitting state in which the speed stage of the transmission 26 is second speed and the lockup clutch 27 is in the non-connected state. Second speed lockup travel refers to a power-transmitting state in which the speed stage of the transmission 26 is second speed and the lockup clutch 27 is in the connected state. The other power-transmitting states are similarly defined by the combination of the speed stage number of the transmission 26 and the state of the lockup clutch 27. However, when the maximum speed stage is set to third speed, the gear is changed in a range from second speed torque conversion travel to third speed lockup travel. When the maximum speed stage is set to second speed, the gear is changed in a range from second speed torque conversion travel to second speed lockup travel. First speed torque conversion travel is set when the maximum speed stage is set to first speed. It is possible for a lockup function setting member (not shown) to set the configuration so that lockup travel is not executed. In these cases, the second controller 10b changes gears in the sequence of second speed torque conversion travel, third speed torque conversion travel, and fourth speed torque conversion travel, in accordance with the increase in vehicle speed.

The detection signals of the input pressure, the output pressure, and other attributes of the torque converter device 23 are inputted to the second controller 10b in addition to the above-described detection signals. The first controller 10a and the second controller 10b can communicate with each other by a wireless or wired connection. The detection signals of the engine speed, the fuel injection amount, the accelerator operation amount, and the like are inputted from the first controller 10a to the second controller 10b. The second controller 10b calculates a correction value for correcting the command value of the engine command signal on the basis of these signals in later-described engine torque reduction control. The second controller 10b transmits a correction command signal that corresponds to the correction value to the first controller 10a. This correction value is a value required for obtaining a desired reduction amount in the torque upper limit value. The first controller 10a and the second controller 10b can thereby bring the torque upper limit value to a desired value.

The second controller 10b performs engine torque reduction control for controlling the engine 21 during lockup travel using the second engine torque curve in which the torque upper limit value has been reduced more greatly than the first engine torque curve described above. The engine torque reduction control is described below with reference to the flowchart shown in FIG. 4.

In the first step S1, various items of information are detected. In this step, various items of information are sent to the first controller 10a and the second controller 10b by way of the above-described detection signals. For example, the position of the gear shift operation member 85a is sent as a detection signal to the second controller 10b. Also, the accelerator operation amount is sent as a detection signal to the second controller 10b via the first controller 10a.

In the second step S2, it is determined whether the lockup clutch 27 is in a connected state. Here, the second controller 10b determines whether the connection of the lockup clutch 27 is completed or whether the connection of the lockup clutch 27 is underway to completion on the basis of the input shaft speed and the output shaft speed of the torque converter device 23. The engine speed detected by the engine speed sensor 91 is used as the input shaft speed of the torque converter device 23. The speed of the input shaft of the transmission 26 detected by the transmission input speed sensor 93 is used as the output shaft speed of the torque converter device 23. In the case that the lockup clutch 27 is in a connected state, the process proceeds to the third step S3.

Figure 5:
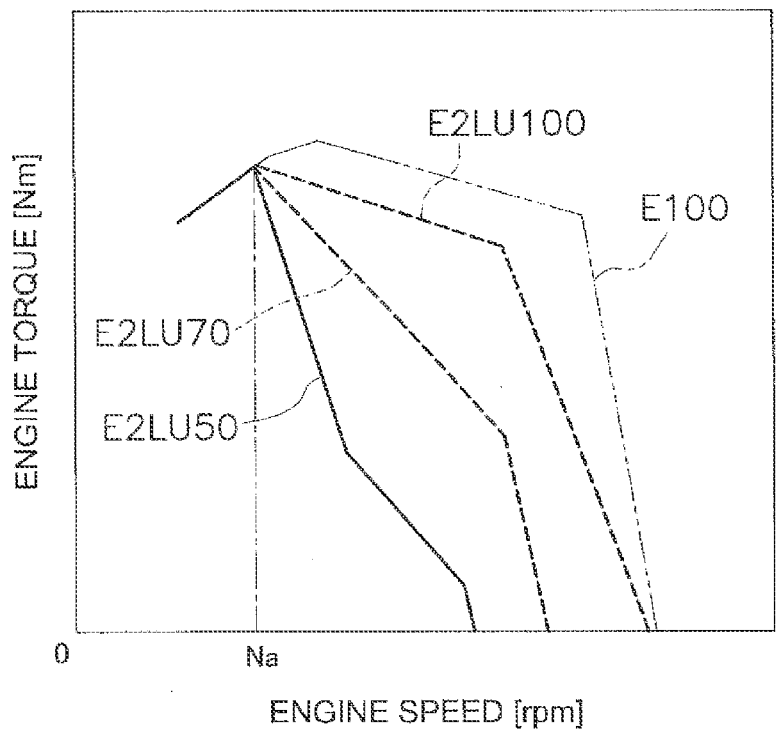
FIG. 5 is a diagram showing examples of the second engine torque curve.

The torque reduction amount is calculated in the third step S3. Here, the second controller 10b calculates the torque reduction amount for varying the first engine torque curve described above in the manner of the second engine torque curves E2LU100, E2LU70, E2LU50, E3LU100, E3LU70, E3LU50 shown in FIGS. 5 and 6. The second controller 10b calculates the torque reduction amount on the basis of the position of the gear shift operation member 85a and the accelerator operation amount. The second engine torque curves E2LU100, E2LU70, E2LU50 shown in FIG. 5 are engine torque curves for when second speed is selected as the maximum speed stage. In particular, E2LU100 is the engine torque curve for when the accelerator operation amount is 100%. E2LU70 is the engine torque curve for when the accelerator operation amount is 70%. E2LU50 is the engine torque curve for when the accelerator operation amount is 50%. In this manner, the engine torque of the second engine torque curves E2LU100, E2LU70, E2LU50 increases or decreases in accordance with the increase or decrease in the operation amount of the accelerator operation member 81a in an engine speed range of Na or greater.

Figure 6:
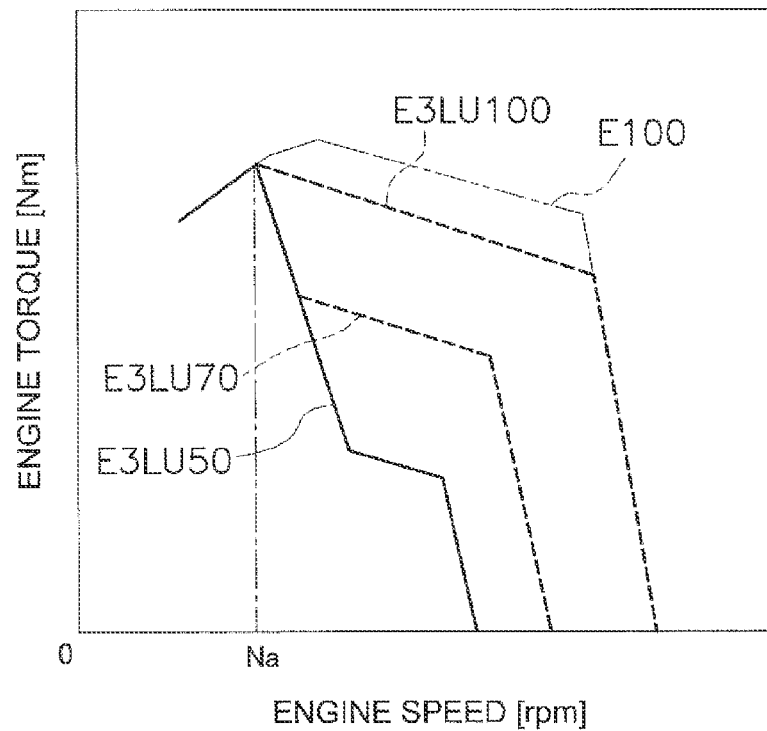
FIG. 6 is a diagram showing examples of the second engine torque curve.

The second engine torque curves E3LU100, E3LU70, E3LU50 shown in FIG. 6 is an engine torque curve for when third speed or fourth speed is selected as the maximum speed stage and the actual speed stage of the transmission 26 is second speed. In particular, E3LU100 is the engine torque curve for when the accelerator operation amount is 100%. E3LU70 is the engine torque curve for when the accelerator operation amount is 70%. E3LU50 is the engine torque curve for when the accelerator operation amount is 50%. In this manner, the engine torque of the second engine torque curves E3LU100, E3LU70, E3LU50 increases or decreases in accordance with the increase or decrease in the operation amount of the accelerator operation member 81a in an engine speed range of Na or greater.

Figure 7:
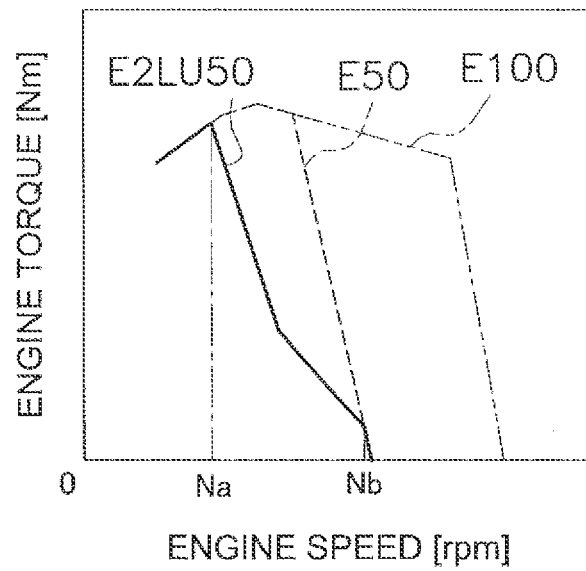
FIG. 7 is a diagram showing examples of the second engine torque curve when the accelerator operation amount is 50%.
Figure 7:
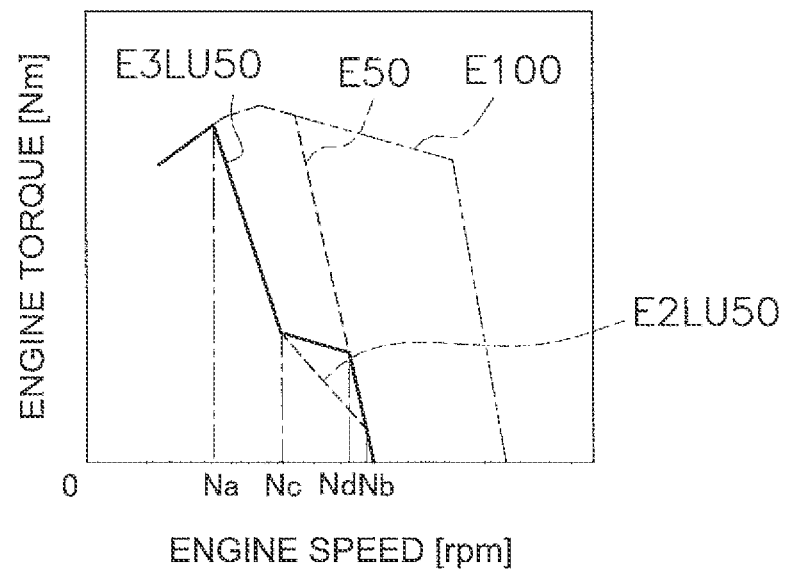

In the case that the accelerator operation amount is 50%, the engine torque of the second engine torque curve E2LU50 for when the maximum speed stage is second speed is less than the engine torque of the first engine torque curve E50 in the engine speed range of Na to Nb, as shown in FIG. 7(a). Also, in the case that the accelerator operation amount is 50%, the engine torque of the second engine torque curve E3LU50 for when the maximum speed stage is third speed or higher is less than the engine torque of the first engine torque curve E50 in an engine speed range of Na to Nd, as shown in FIG. 7(b). Furthermore, the engine torque of the second engine torque curve E3LU50 for when the maximum speed stage is third speed or higher is greater than the engine torque of the second engine torque curve E2LU50 for when the maximum speed stage is second speed in an engine speed range of Nc to Nb, as shown in FIG. 7(b). In other words, in the engine speed range of Nc or higher and Nb or lower, the torque reduction amount of the second engine torque curve E3LU50 is less than the torque reduction amount of the second engine torque curve E2LU50.

Figure 8:
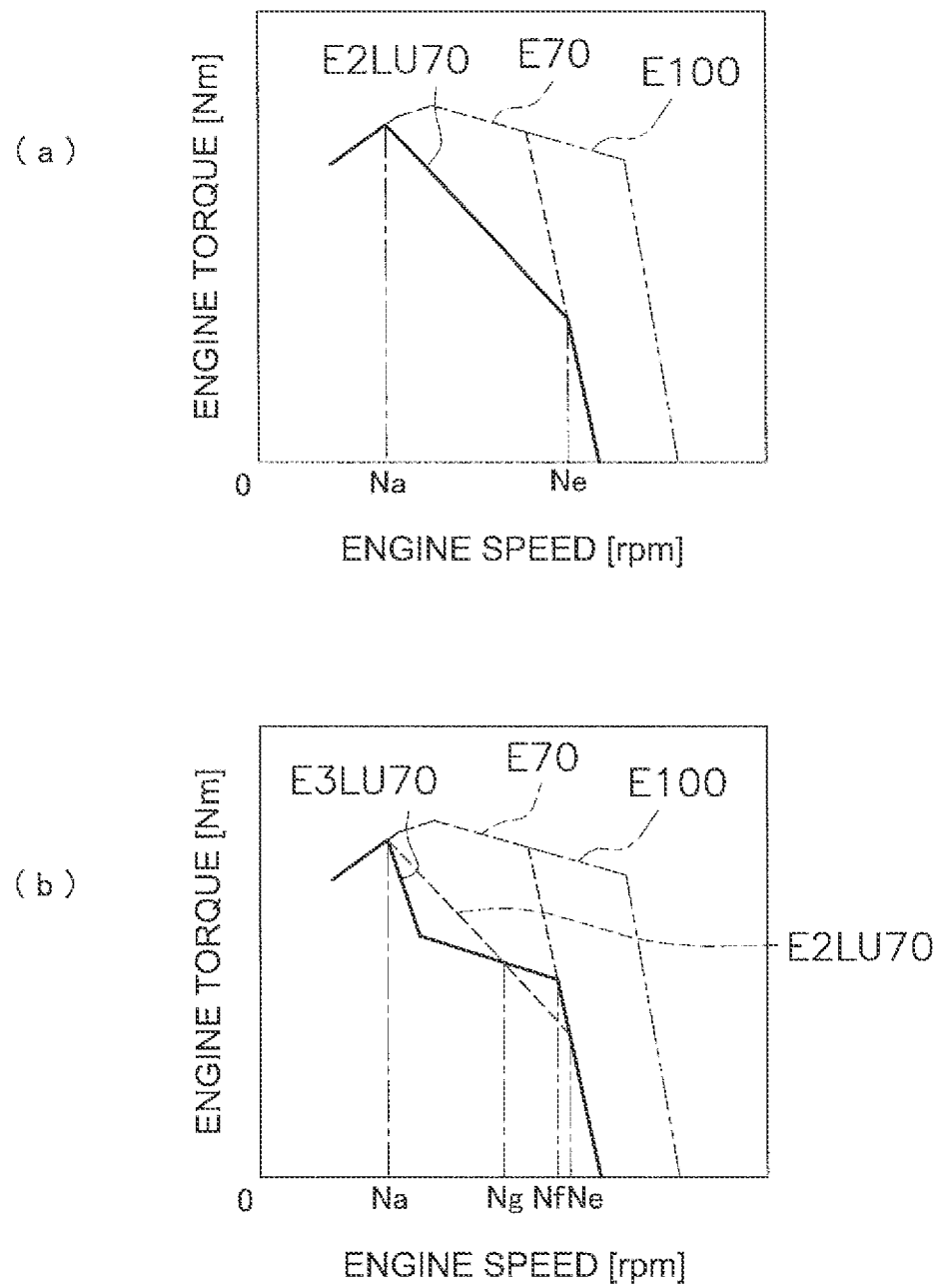
FIG. 8 is a diagram showing examples of the second engine torque curve when the accelerator operation amount is 70%.

In the case that the accelerator operation amount is 70%, the engine torque of the second engine torque curve E2LU70 for when the maximum speed stage is second speed is less than the engine torque of the first engine torque curve E70 in the engine speed range of Na to Ne, as shown in FIG. 8(a). Also, in the case that the accelerator operation amount is 70%, the engine torque of the second engine torque curve E3LU70 for when the maximum speed stage is third speed or higher is less than the engine torque of the first engine torque curve E70 in an engine speed range of Na to Ne, as shown in FIG. 8(b). Furthermore, the engine torque of the second engine torque curve E3LU70 for when the maximum speed stage is third speed or higher is greater than the engine torque of the second engine torque curve E2LU70 for when the maximum speed stage is second speed in an engine speed range of Ng to Ne, as shown in FIG. 8(b). In other words, in the engine speed range of Ng or higher and Ne or lower, the torque reduction amount of the second engine torque curve E3LU70 is less than the torque reduction amount of the second engine torque curve E2LU70.

Figure 9:
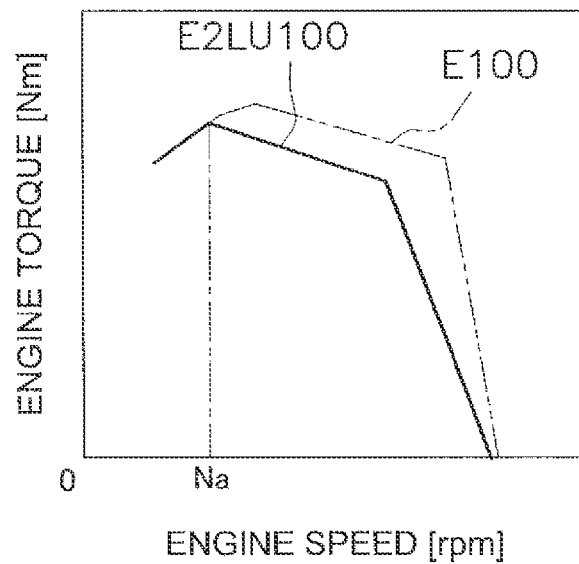
FIG. 9 is a diagram showing examples of the second engine torque curve when the accelerator operation amount is 100%.
Figure 9:
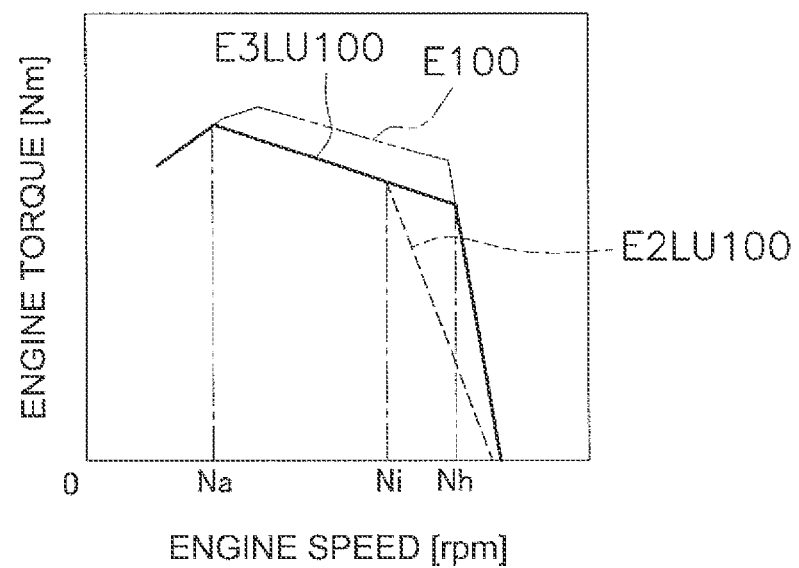

In the case that the accelerator operation amount is 100%, i.e., in the case that the operation amount of the accelerator operation member 81a is maximum, the engine torque of the second engine torque curve E2LU100 for when the maximum speed stage is second speed is less than the engine torque of the first engine torque curve E100 in the engine speed range of Na or higher, as shown in FIG. 9(a). Also, in the case that the accelerator operation amount is 100%, the engine torque of the second engine torque curve E3LU100 for when the maximum speed stage is third speed or higher is less than the engine torque of the first engine torque curve E100 in an engine speed range of Na to Nh, as shown in FIG. 9(b). Furthermore, the engine torque of the second engine torque curve E3LU100 for when the maximum speed stage is third speed or higher is greater than the engine torque of the second engine torque curve E2LU 100 for when the maximum speed stage is second speed in an engine speed range of Ni or higher, as shown in FIG. 9(b). In other words, in the engine speed range of Ni or higher, the torque reduction amount of the second engine torque curve E3LU100 is less than the torque reduction amount of the second engine torque curve E2LU100.

The engine speed range in which the engine torque of the second engine torque curve described above is less than the engine torque of the first engine torque curve includes a predetermined speed range that includes the switch speed at which a switch is made from torque conversion travel to lockup travel. For example, the engine speed range Na to Nb shown in FIG. 7(a) includes the switch speed at which a switch is made from second speed torque conversion travel to second speed lockup travel.

Figure 4:
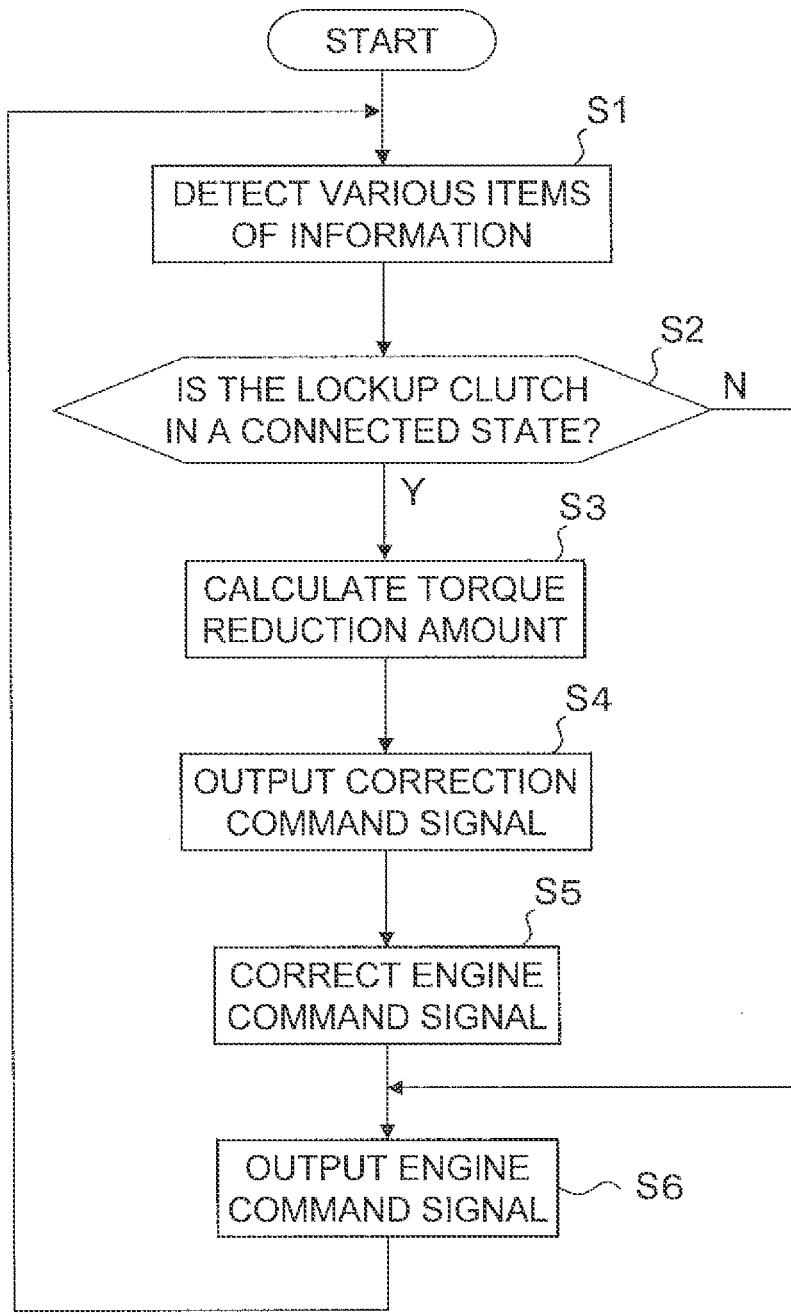
FIG. 4 is a flowchart showing the process in engine torque reduction control.

Returning to the flowchart of FIG. 4, a correction command signal is outputted in the fourth step S4. Here, the second controller 10b calculates a correction value of an engine speed command that corresponds to the torque reduction amount calculated in the third step S3, and sends to the first controller 10a the correction command signal that corresponds to the correction value.

The engine command signal is corrected in the fifth step S5. Here, the first controller 10a receives the correction command signal sent from the second controller 10b. The first controller 10a uses the correction command signal to correct the command value of the engine command signal.

The engine command signal is outputted in the sixth step S6. Here, the first controller 10a sends the engine command signal to the governor 25, as described above. In the second step S2, when the lockup clutch 27 is determined to be in a non-connected state, the first controller 10a sends the engine command signal to the governor 25 without correction by the engine torque reduction control. In other words, during torque conversion travel, the controller 10 controls the engine 21 on the basis of the first engine torque curve described above. On the other hand, in the second step S2, the first controller 10a uses the correction command signal from the second controller 10b to correct the engine command signal and sends the corrected engine command signal to the governor 25 when the lockup clutch 27 is determined to be in a connected state. In other words, during the lockup travel, the controller 10 controls the engine 21 on the basis of the second engine torque curve described above.

Figure 10:
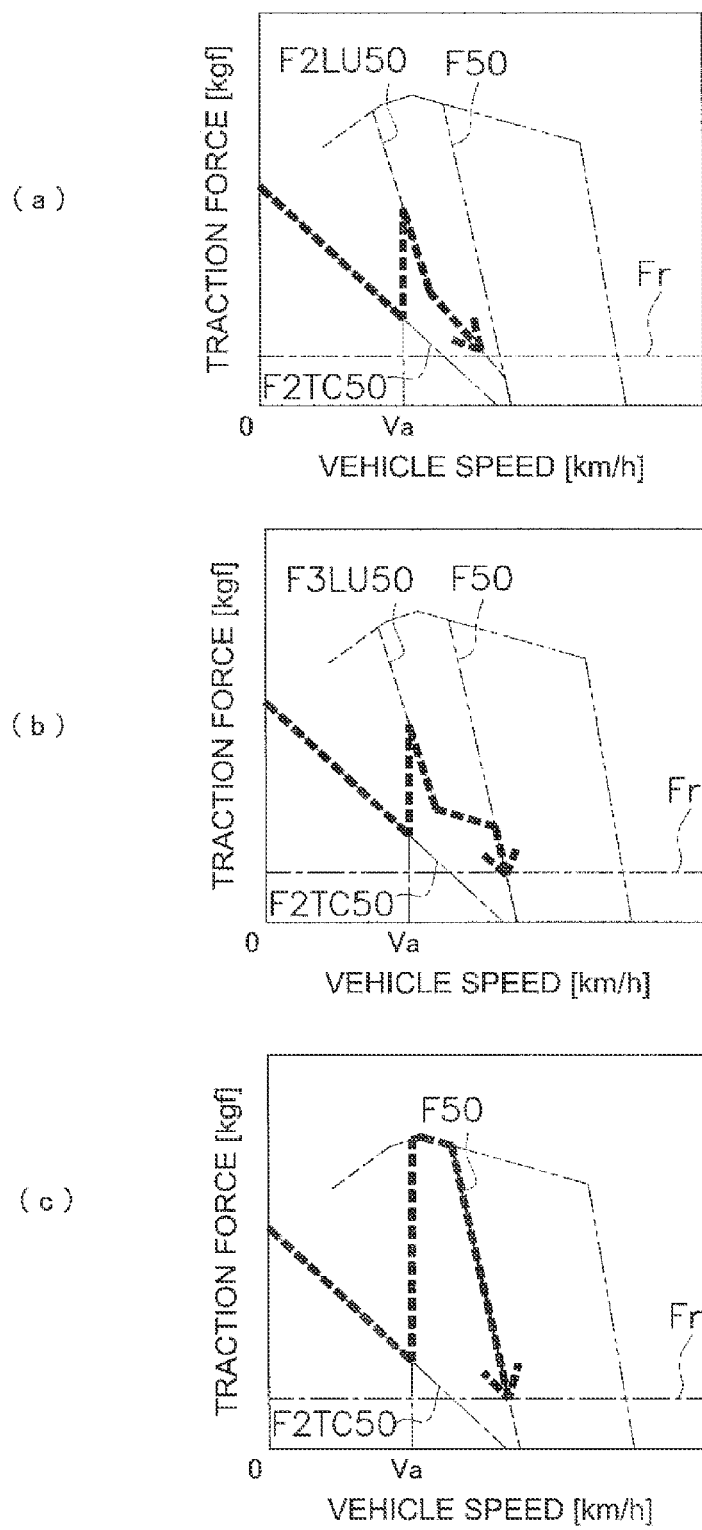
FIG. 10 is a travel performance line diagram of when the accelerator operation amount is 50%.
Figure 11:
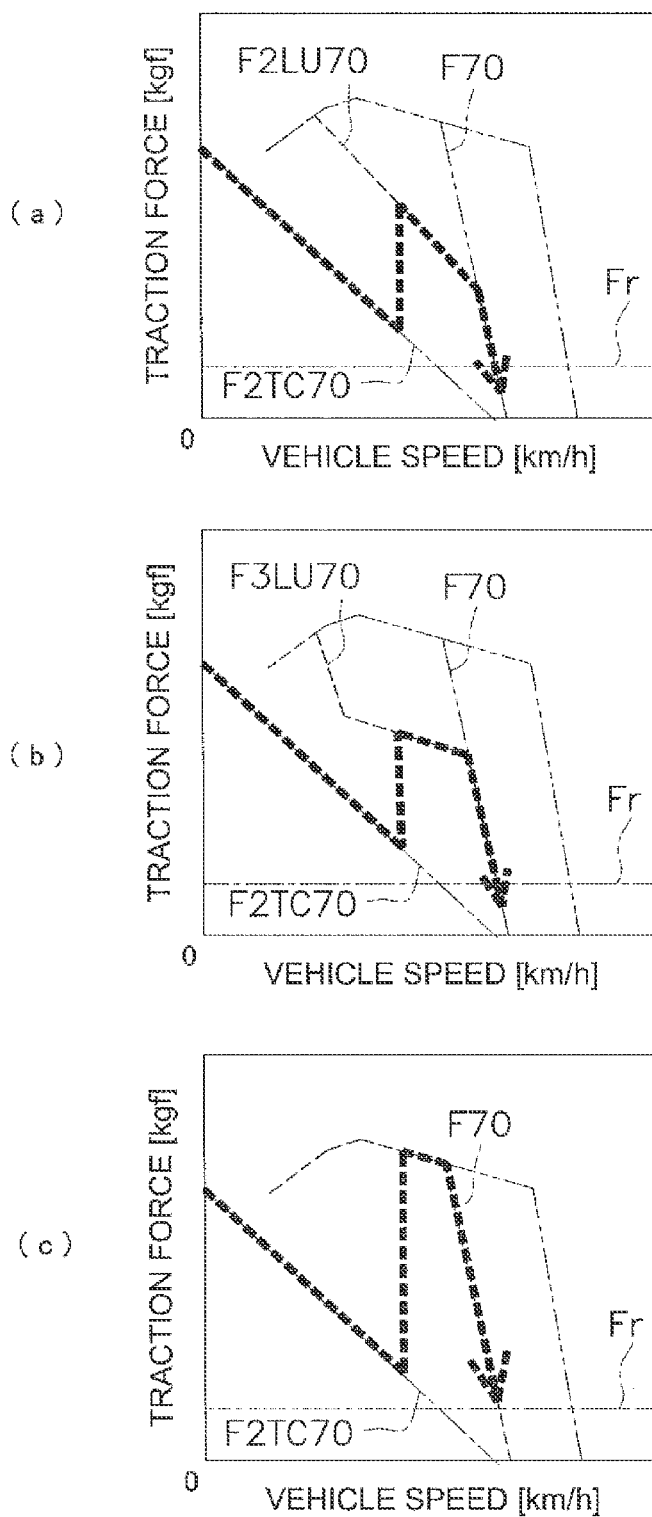
FIG. 11 is a travel performance line diagram of when the accelerator operation amount is 70%.
Figure 12:
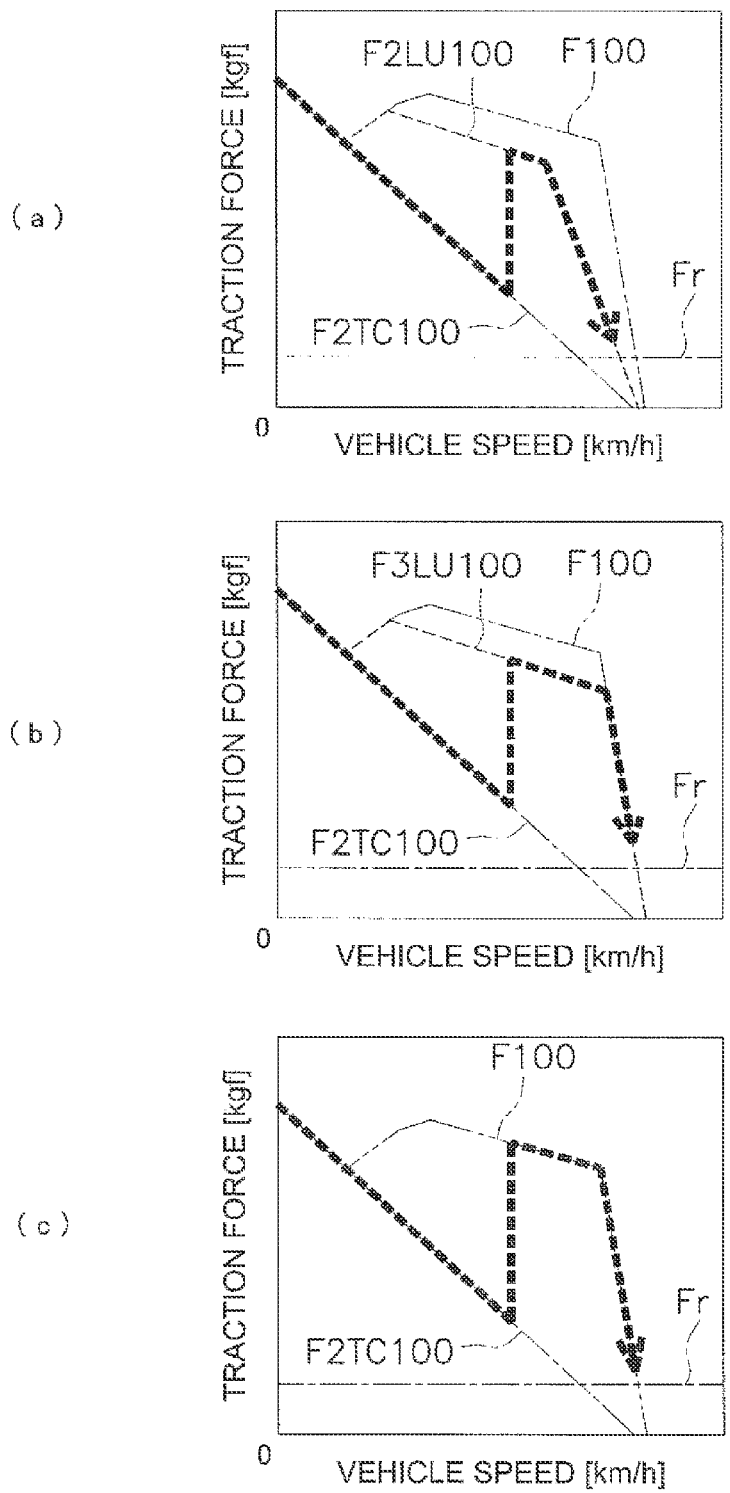
FIG. 12 is a travel performance line diagram of when the accelerator operation amount is 100%.

In the work vehicle 1 of an embodiment of the present invention, the engine is controlled on the basis of the first engine torque curve during torque conversion travel. Also, the engine is controlled on the basis of the second engine torque curve during lockup travel. Accordingly, the amount of increase in the traction force of the vehicle is inhibited when a switch is made and after the switch has been made from torque conversion travel to lockup travel, as shown in FIGS. 10 to 12. FIGS. 10 to 12 are travel performance line diagrams of the vehicle when a switch is made from second speed torque conversion travel to second speed lockup travel. In the diagrams, the vertical axis is the traction force of the vehicle, and the horizontal axis is the vehicle speed. The dot-dash line Fr shows the travel resistance of the vehicle. The dot-dash lines F2TC50, F2TC70, F2TC100 show the traction force during second speed torque conversion travel in which the accelerator operation amounts are 50%, 70%, and 100%, respectively. The other reference numerals that start with F in the diagrams show that the travel performance line is produced by the corresponding engine torque curve. For example, in FIG. 10(a), the F2LU50 shows that the travel performance line is produced by the second torque curve E2LU50. F50 shows that the travel performance line is produced by the first torque curve E50. The broken line shows the change in the traction force of the vehicle when a switch is made from second speed torque conversion travel to second speed lockup travel.

Specifically, FIG. 10(a) is a travel performance line diagram of the case in which the accelerator operation amount is 50% and the maximum speed stage is second speed. FIG. 10(b) is a travel performance line diagram of the case in which the accelerator operation amount is 50% and the maximum speed stage is third speed or higher. FIG. 10(c) is a travel performance line diagram when the accelerator operation amount is 50% in a work vehicle according to a comparative example. In the work vehicle according to the comparative example, the engine 21 is controlled by the first engine torque curve in the same manner as torque conversion travel without a reduction in the engine torque during lockup travel.

FIG. 11(a) is a travel performance line diagram of the case in which the accelerator operation amount is 70% and the maximum speed stage is second speed. FIG. 11(b) is a travel performance line diagram of the case in which the accelerator operation amount is 70% and the maximum speed stage is third speed or higher. FIG. 11(c) is a travel performance line diagram when the accelerator operation amount is 70% in a work vehicle according to the same comparative example noted above.

FIG. 12(a) is a travel performance line diagram of the case in which the accelerator operation amount is 100% and the maximum speed stage is second speed. FIG. 12(b) is a travel performance line diagram of the case in which the accelerator operation amount is 100% and the maximum speed stage is third speed or higher. FIG. 12(c) is a travel performance line diagram when the accelerator operation amount is 100% in a work vehicle according to the same comparative example noted above.

Figure 13:
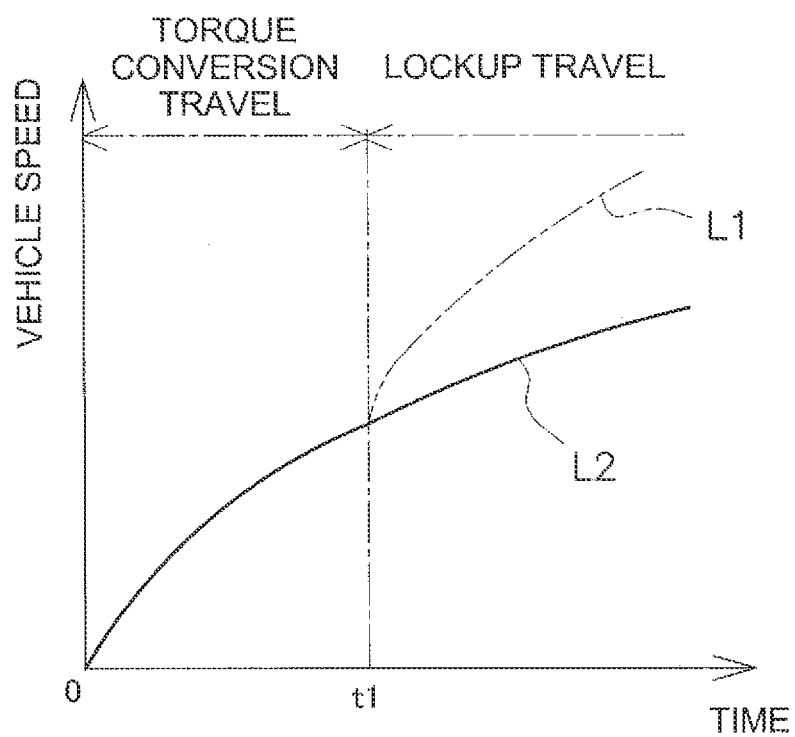
FIG. 13 is a diagram showing the change in vehicle speed when a switch has been made from torque conversion travel to lockup travel.

In FIG. 13, the switch from torque conversion travel to lockup travel is performed at time t1. The solid line L2 shows the change in vehicle speed in the case that engine torque reduction control has been carried out. The two-dot dash line L1 shows the vehicle speed in the case that engine torque reduction control is not being carried out.

It is apparent from FIGS. 10 to 12 that in the work vehicle 1 according to an embodiment of the present invention, the amount of increase in the traction force of the vehicle when a switch is made and after a switch has been made from torque conversion travel to lockup travel is inhibited more greatly than in the comparative example. Therefore, the increase in vehicle speed is inhibited immediately after a switch has been made from torque conversion travel to lockup travel, as shown by the solid line L2 in FIG. 13, and fuel economy can thereby be improved. Also, a reduction in ease of operation is inhibited because an increase in vehicle speed is inhibited even when the lockup function is enabled. Accordingly, fuel economy can be further improved because lockup travel is effectively used during work.

The engine torque of the second engine torque curve is less than the engine torque of the first engine torque curve in a predetermined speed range that includes the switch speed at which a switch is made from torque conversion travel to the lockup travel. Accordingly, it is possible to inhibit shock that occurs in the vehicle when a switch is made from torque conversion travel to lockup travel.

The engine torque of the second engine torque curve increases and decreases in accordance with the increase and decrease in the operation amount of the accelerator operation member 81a. Specifically, the engine torque of the second engine torque curve is greater in correspondence with a greater operation amount of the accelerator operation member 81a, as shown in FIGS. 5 and 6. In other words, the torque reduction amount during lockup travel is lower in correspondence with a greater operation amount of the accelerator operation member 81a. When the operation amount of the accelerator operation member 81a is high, it is often the case that the operator desires to accelerate the vehicle or desires a large output for the work implement 3. Therefore, the torque reduction amount during lockup travel is reduced in such conditions, thereby making it possible to inhibit a reduction in the acceleration performance or the output of the work implement 3. Conversely, when the operation amount of the accelerator operation member 81a is low, it is often the case that the operator does not desire to accelerate the vehicle or does not desire a large output for the work implement 3. Therefore, the operator does not perceive a reduction in ease of operation even when the torque reduction amount increases in such conditions. Also, fuel economy can be improved by an increase in the torque reduction amount.

The controller 10 controls the engine on the basis of different second engine torque curves in the case that the maximum speed stage selected by the gear shift operation member 85a is different, even when the actual speed stage of the transmission 26 is the same speed stage. Specifically, the engine torque of the second engine torque curve when the maximum speed stage is third speed or higher is greater than the engine torque of the second engine torque curve when the maximum speed stage is second speed, as shown in FIGS. 7(b), 8(b), 9(b). When the operator sets the maximum speed stage to second speed, it is often the case that work will be performed in which a short movement distance is repeated. This is due to the fact that there are few conditions in which the speed will be increased because short travel distance and stopping will be repeated. On the other hand, when the operator sets the maximum speed stage to third speed or higher, it is often the case that movement over a long distance will be performed. This is due to the fact that the vehicle speed may increase to maximum speed because the vehicle travels over a long distance. Therefore, the engine torque is high, i.e., the torque reduction amount is low when the maximum speed stage is third speed or higher, whereby a reduction in the acceleration performance of the vehicle can be inhibited. On the other hand, the operator does not perceive a reduction in ease of operation even when the engine torque is low, i.e., the torque reduction amount is high when the maximum speed stage is second speed. Also, fuel economy can be improved by an increase in the torque reduction amount.

An embodiment of the present invention was described above, but the present invention is not limited by the embodiment described above; various modifications can be made within a range that does not depart from the spirit of the invention.

In the work vehicle according to the embodiment described above, a first controller 10a and a second controller 10b are separately provided, but these may be integrally provided. For example, the functions of first controller 10a and the second controller 10b may be implemented using a single computer. Conversely, the functions of the first controller 10a or the second controller 10b may be shared by a plurality of computers.

The various operation members described above are not limited to pedals, levers, and other members as exemplified above. It is also possible to otherwise use dials, and/or switches, or the like.

Figure 14:
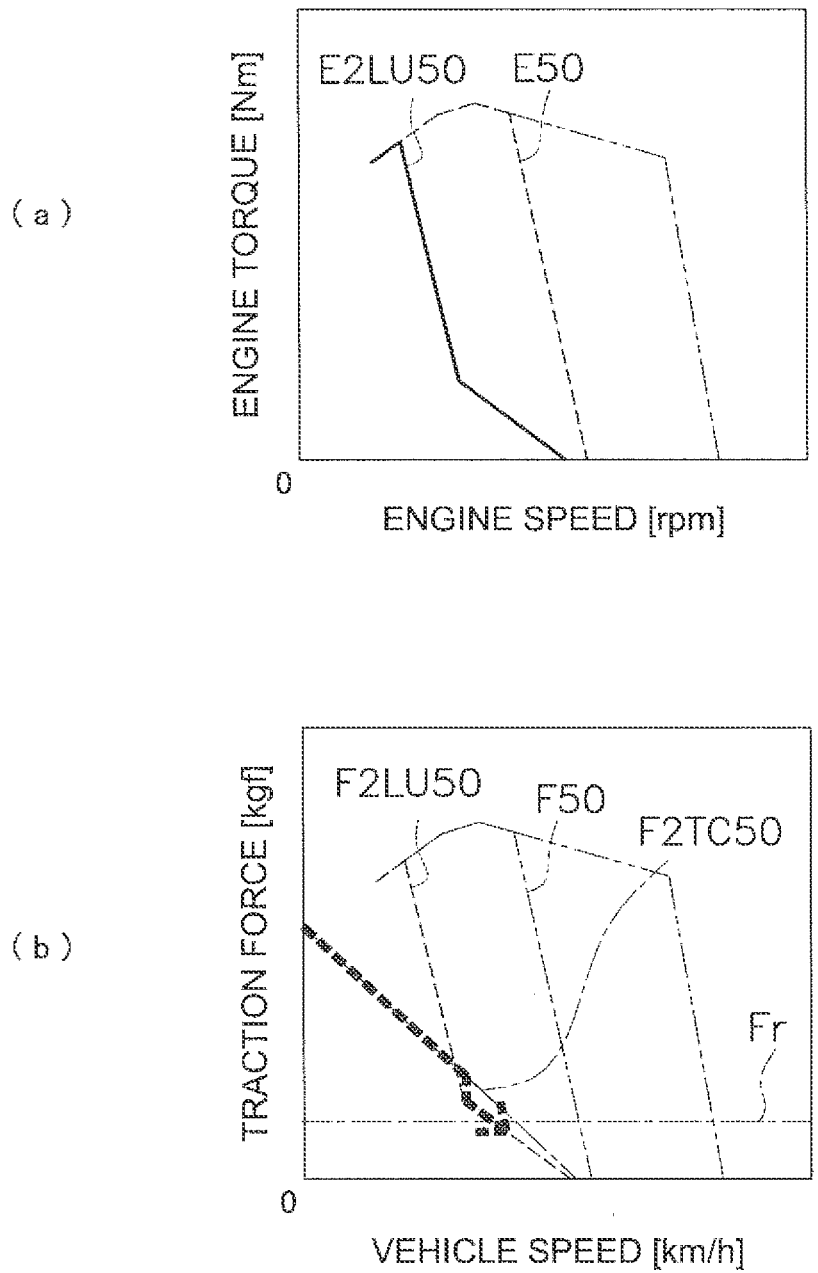
FIG. 14 is a diagram showing examples of the second engine torque curve according to another embodiment.

In the embodiment described above, the travel performance lines F2LU50, F3LU50 produced by the second engine torque curves E2LU50, E3LU50 are positioned above the travel performance line F2TC50 during torque conversion travel, as shown in FIG. 10. The travel performance lines F2LU70, F3LU70 produced by the second engine torque curves E2LU70, E3LU70 are positioned above the travel performance line F2TC70 during torque conversion travel, as shown in FIG. 11. The travel performance lines F2LU100, F3LU100 produced by the second engine torque curves E2LU100, E3LU100 are positioned above the travel performance line F2TC100 during torque conversion travel, as shown in FIG. 12. In other words, in the case that the vehicle speed is the same, the traction force of the second engine torque curve during second speed lockup travel is greater than the traction force during second speed torque conversion travel. However, the travel performance line F2LU50 produced by the second engine torque curve E2LU50 may be positioned below the travel performance line F2TC50 during second speed torque conversion travel, as shown in FIG. 14. In other words, in the case that the vehicle speed is the same, the traction force produced by the second engine torque curve may be less than the traction force during torque conversion travel. In this case, it is possible to further improve fuel economy.

Figure 15:
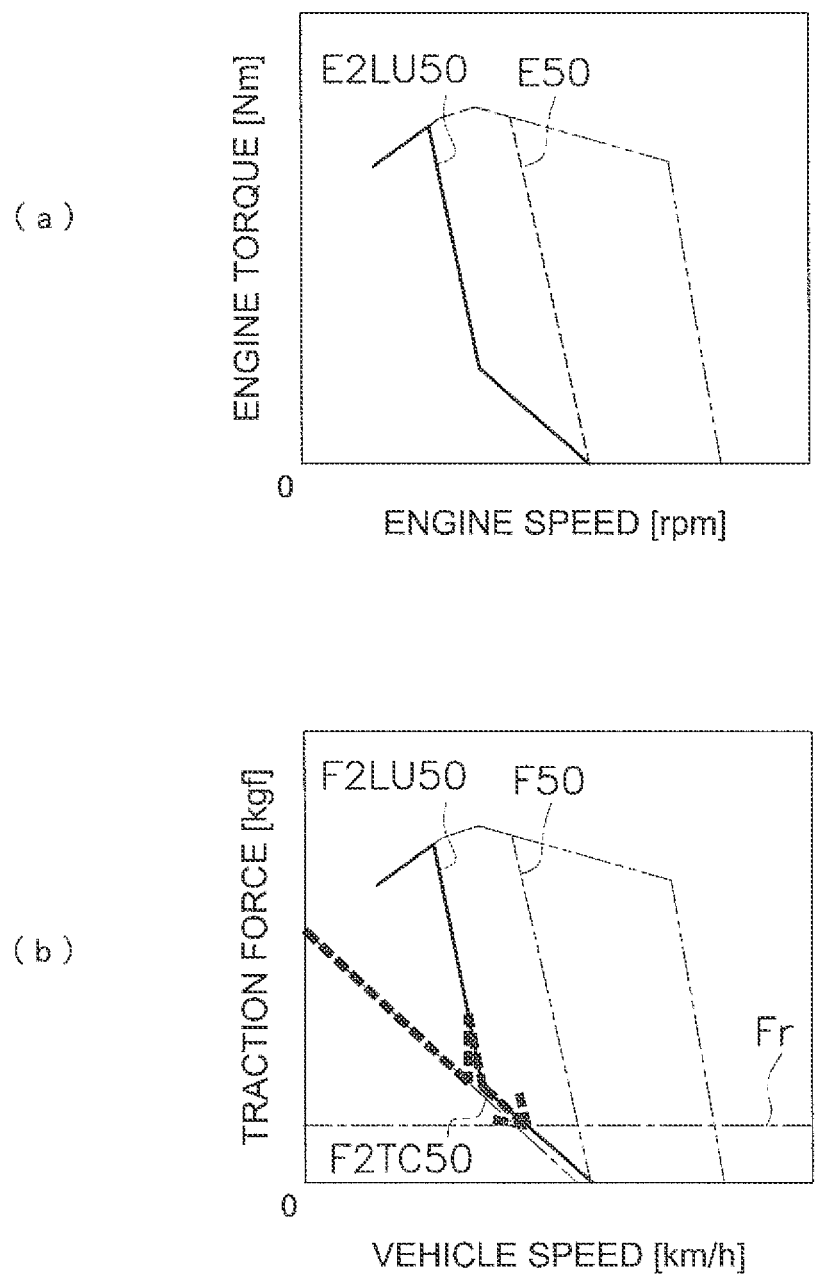
FIG. 15 is a diagram showing examples of the second engine torque curve according to another embodiment.

The travel performance line F2LU50 produced by the second engine torque curve E2LU50 during second speed lockup travel may be positioned slightly above the travel performance line F2TC50 during second speed torque conversion travel, as shown in FIG. 15. In other words, in the case that the vehicle speed is the same, the traction force of the second engine torque curve is slightly greater than the traction force during torque conversion travel. In this case as well, it is possible to further improve fuel economy. However, the configuration in which the traction force of the second engine torque curve is greater than the traction force during second speed torque conversion travel as in the embodiment described above is capable of improving acceleration performance of the vehicle or the output of the work implement 3.

The application of the present invention is not limited to engine control that uses an all-speed governor control scheme. For example, the present invention may be applied to engine control that uses a minimum-maximum speed governor control scheme. However, in the all-speed governor control, the characteristics of the engine torque vary in the regulation range in accordance with the accelerator operation amount as described above. On the other hand, the characteristics TM of the engine torque in all load regions in which the fuel injection amount of the governor 25 is maximum does not vary in accordance with accelerator operation amount. Accordingly, there is a drawback in that there is a strong tendency for the difference between the traction force during lockup travel and torque conversion travel to increase. In other words, the problem in which the vehicle speed increases immediately after a switch is made from torque conversion travel to lockup travel as described above is markedly apparent in all-speed governor control. Therefore, the present invention is applied to all-speed governor control, whereby excellent effects are more readily realized.

Figure 16:
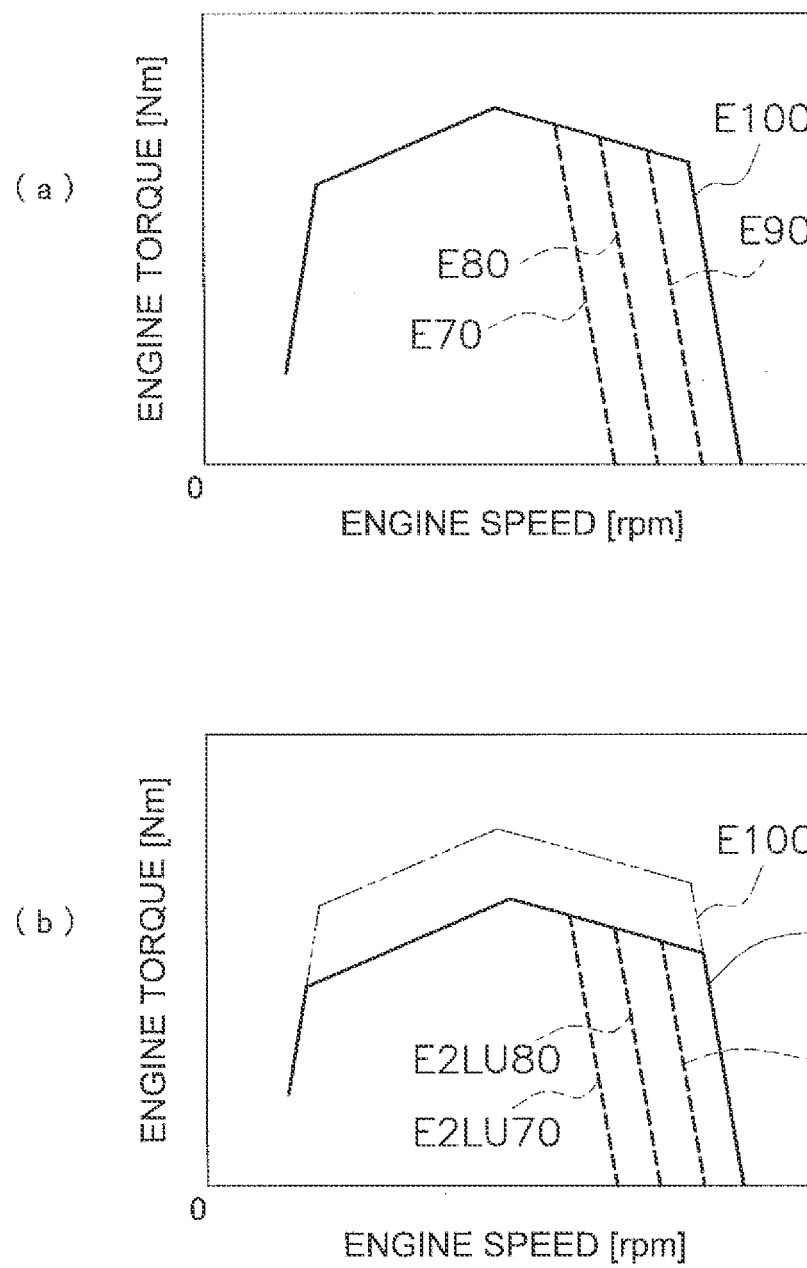
FIG. 16 is a diagram showing examples of the second engine torque curve according to another embodiment.
Figure 17:
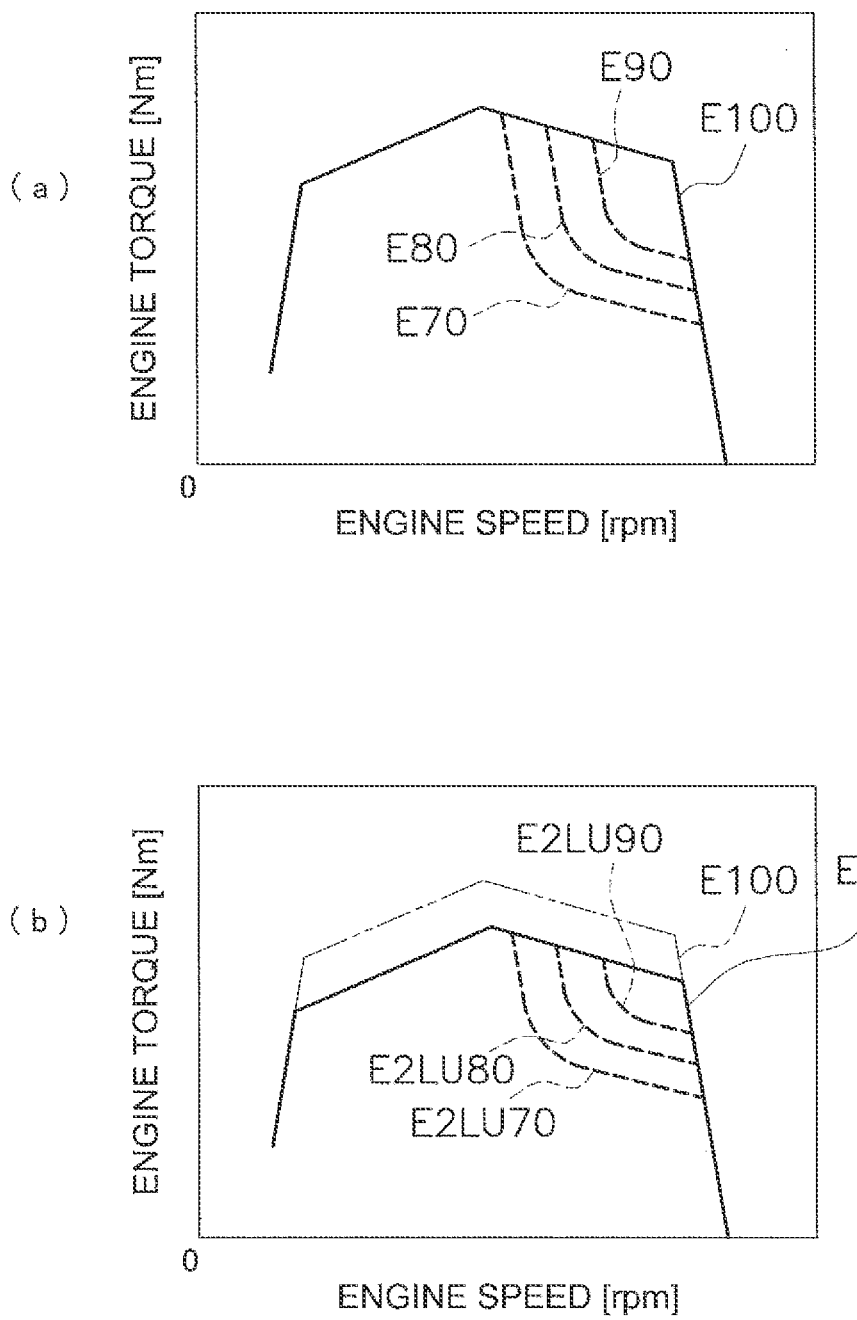
FIG. 17 is a diagram showing an example of the second engine torque curve according to another embodiment.

In the embodiment described above, the engine torque is partially reduced in all load regions of the second engine torque curve, but the engine torque may be entirely reduced in all load regions. For example, in engine control that uses an all-speed governor control scheme, the second engine torque curves E2LU100, E2LU90, E2LU80, E2LU70 shown in FIG. 16(b) may be used for the first engine torque curve E100, E90, E80, E70 shown in FIG. 16(a). In engine control that uses a minimum-maximum speed governor control scheme, the second engine torque curves E2LU100, E2LU90, E2LU80, E2LU70 shown in FIG. 17(b) may be used for the first engine torque curve E100, E90, E80, E70 shown in FIG. 17(a).

In the embodiment described above, the engine torque of the second engine torque curve is less than the engine torque of the first engine torque curve in a portion of the range of the engine speed when the accelerator operation amount is the same. However, the engine torque of the second engine torque curve may be less than the engine torque of the first engine torque curve in all ranges of the engine speed.

In the embodiment described above, the engine torque of the second engine torque curve is less than the engine torque of the first engine torque curve when the operation amount is 100% or less, which is the maximum accelerator operation amount. However, the engine torque of the second engine torque curve may be less than the engine torque of the first engine torque curve when the operation amount is equal to or less than a predetermined operation amount that is less than 100%. In other words, when the accelerator operation amount is 100%, the engine torque of the second engine torque curve is the same as the engine torque of the first engine torque curve.

Figure 18:
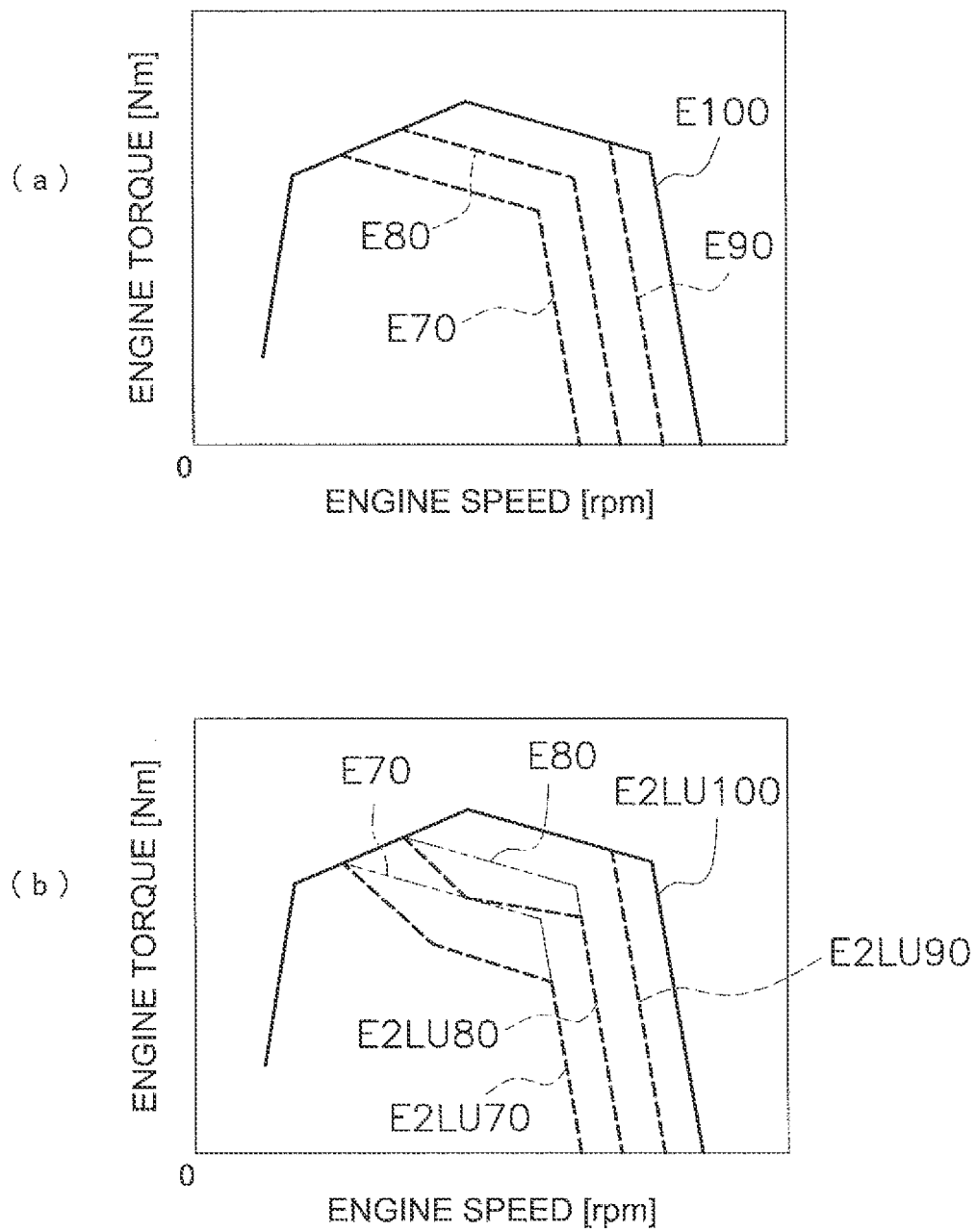
FIG. 18 is a diagram showing examples of the second engine torque curve according to another embodiment.

For example, the engine torque of the second engine torque curve may be less than the engine torque of the first engine torque curve when the accelerator operation amount is 80% or less, as shown in FIG. 18. The engine torque of the second engine torque curve may be the same as the first engine torque curve when the accelerator operation amount is greater than the 80%. Specifically, the second engine torque curves E2LU100, E2LU90, E2LU80, E2LU70 shown in FIG. 18(b) may be used for the first engine torque curve E100, E90, E80, E70 shown in FIG. 18(a). In this case, the second engine torque curves E2LU100, E2LU90 when the accelerator operation amounts are 100% and 90% are the same as the first engine torque curves E100, E90 when the accelerator operation amounts are 100% and 90%, respectively. In contrast, in the second engine torque curves E2LU80, E2LU70 when the accelerator operation amounts are 80% and 70%, the engine torque is lower in at least a portion of the range of the engine speed than the first engine torque curves E80, E70 when the accelerator operation amounts are 80% and 70%, respectively.

In the embodiment described above, the engine torque of the second engine torque curve increases or decreases in accordance with the increase or decrease in the operation amount of the accelerator operation member 81a in a portion of the range of the engine speed. However, the engine torque of the second engine torque curve may increase and decrease in accordance with the increase or decrease in the operation amount of the accelerator operation member 81a in the entire range of the engine speed.

Figure 19:
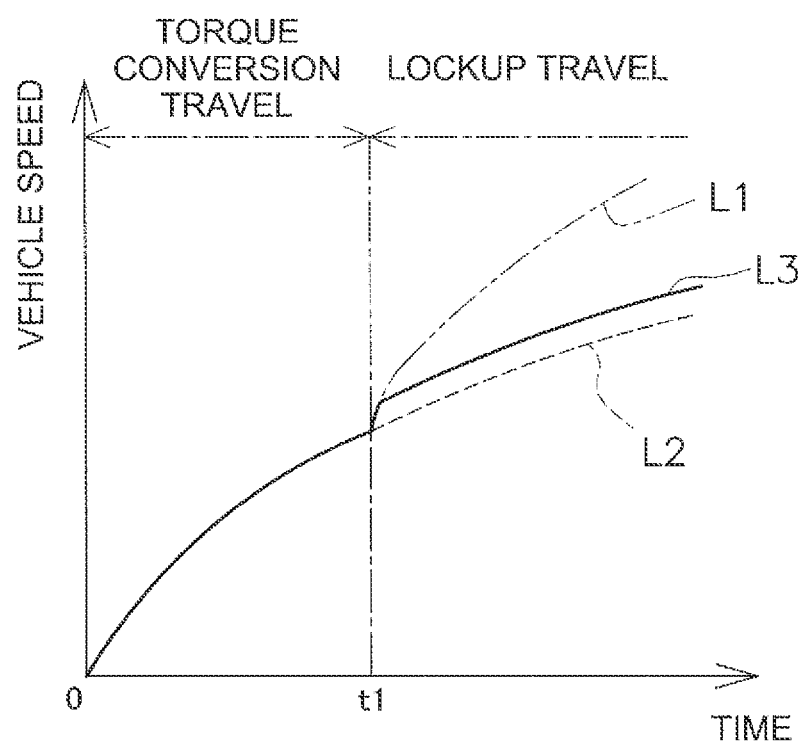
FIG. 19 is a diagram showing the change in vehicle speed when a switch has been made from torque conversion travel to lockup travel in the work vehicle of another embodiment.

In the embodiment described above, the engine speed range in which the engine torque of the second engine torque curve is less than the engine torque of the first engine torque curve includes a predetermined speed range that includes the switch speed at which a switch is made from torque conversion travel to lockup travel. However, the engine torque of the second engine torque curve may be less than the engine torque of the first engine torque curve in a speed range that does not include the switch speed. In this case, fuel economy can be improved because it is possible to inhibit an increase in the vehicle speed after a switch is made from torque conversion travel to lockup travel, as shown by the solid line L3 in FIG. 19. In FIG. 19, the switch from torque conversion travel to lockup travel is carried out at time t1. The broken line L2 and the solid line L3 show the change in vehicle speed in the case that engine torque reduction control is carried out. In particular, in engine torque reduction control of the solid line L3, the engine torque of the second engine torque curve is less than the engine torque of the first engine torque curve in a speed range that is greater than the switch speed (that does not include the switch speed). In the engine torque reduction control of the broken line L2, the engine torque of the second engine torque curve is less than the engine torque of the first engine torque curve in a speed range that includes the switch speed. In other words, in the engine torque reduction control of the broken line L2 and the solid line L3, the engine torque of the second engine torque curve is less than the engine torque of the first engine torque curve in at least a speed range that is greater than the switch speed. The two-dot dash line L1 shows the change in vehicle speed in the case that the engine torque reduction control is not carried out.

In the embodiment described above, the engine 21 is controlled on the basis of different second engine torque curves when the maximum speed stage is second speed and when the maximum speed stage is third speed or higher. However, the combination of the maximum speed stages in which different second engine torque curves are selected is not limited to that described above. For example, the engine 21 may be controlled on the basis of different second engine torque curves when the maximum speed stage is first speed and when the maximum speed stage is second speed or higher. Alternatively, the engine 21 may be controlled on the basis of different second engine torque curves when the maximum speed stage is second speed, when the maximum speed stage is third speed, and the maximum speed stage is fourth speed.

The speed stage of the transmission 26 is not limited to first speed to fourth speed. The speed stages that can be changed may be greater or fewer. Also, the gear change pattern of the transmission 26 implemented by the second controller 10b is not limited to that described above. For example, the gears may be changed in sequence from first speed in accordance with the maximum speed.

Figure 20:
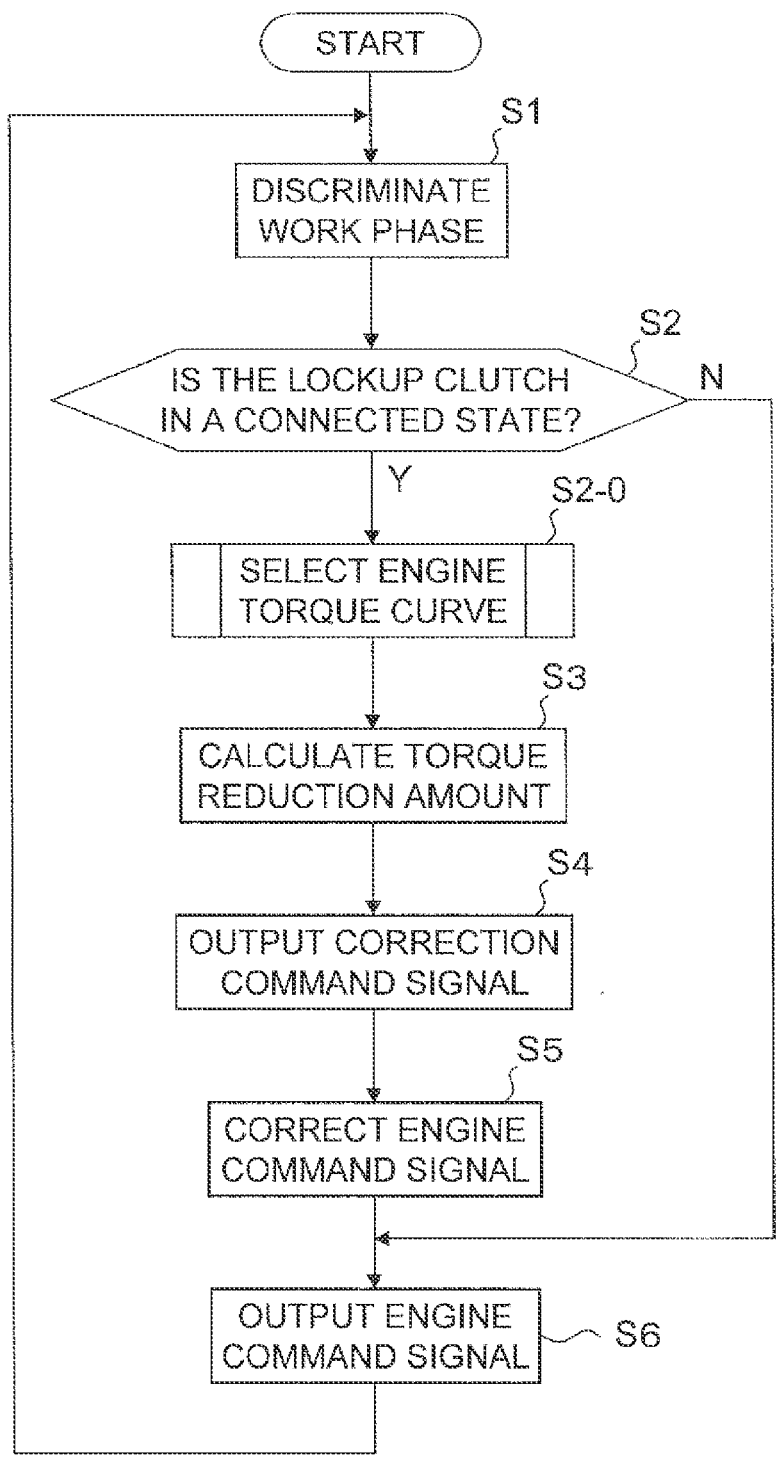
FIG. 20 is a flowchart showing processing in engine torque reduction control in the work vehicle according to another embodiment.

Even in the case that lockup travel is being carried out, the reduction amount of the engine torque may be made less than the reduction amount of the engine torque in the second engine torque curve described above depending on the condition of the work vehicle 1. Alternatively, even in the case that lockup travel is being carried out, the engine torque is not required to be reduced depending on the condition of the work vehicle 1. For example, the controller 10 may determine whether load increase conditions are satisfied, and when the load increase conditions are satisfied, the controller may control the engine 21 on the basis of a third engine torque curve, which is greater than the second engine torque curve during lockup travel. Load increase conditions are conditions that show that the work vehicle 1 is in a situation that will lead to a load being imposed on the work implement 3 or in which the travel load will increase. FIG. 20 shows the processing of the engine torque reduction control when consideration is given to the load increase conditions.

Figure 21:
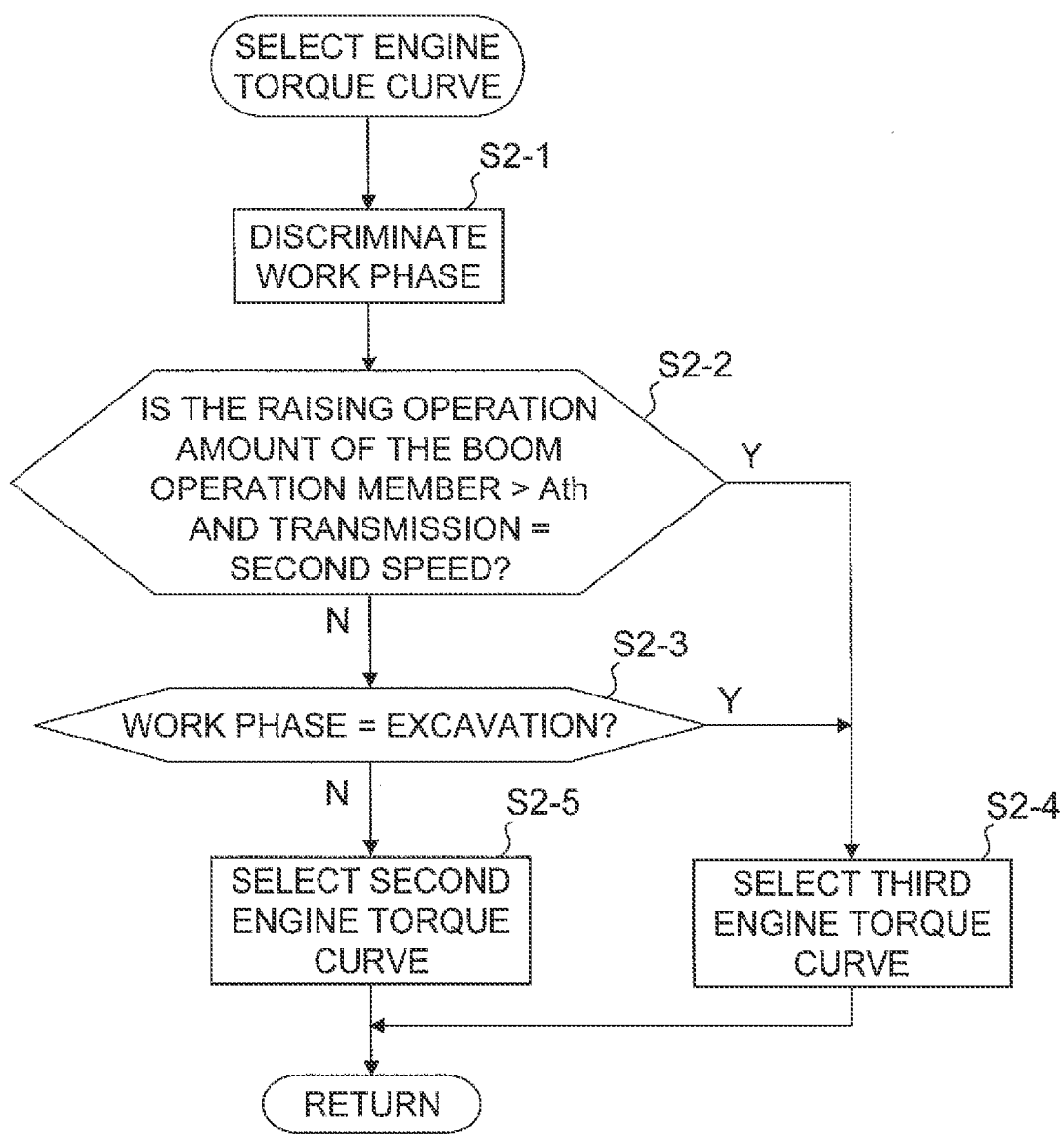
FIG. 21 is a flowchart showing the details of processing for selecting an engine torque curve in FIG. 20.

In the flowchart shown in FIG. 20, a 2nd-0 step S2-0 has been added to the flowchart shown in FIG. 4 described above. In other words, in the second step S2, the process proceeds to the 2nd-0 step S2-0 in the case that the lockup clutch 27 is in a connected state. In the 2nd-0 step S2-0, the engine torque curve to be used for controlling the engine 21 is selected. FIG. 21 shows the details of the processing to be carried out in the 2nd-0 step S2-0.

First, the work phase is discriminated in the 2nd-1 step S2-1. Specifically, the second controller 10b discriminates the work phase in the following manner.

The second controller 10b discriminates the travel status and the work status of the vehicle on the basis of the above-described detection signals. The travel status includes "stop," "forward," and "reverse." In the case that the vehicle speed is equal to or less than a predetermined stop threshold, the second controller 10b determines that the travel status is "stop." The predetermined stop threshold is a value that is sufficiently low enough to allow the vehicle to be considered to be stopped. In the case that the FR operation member 86a is set in the forward position and the vehicle is moving forward, the second controller 10b determines that the travel status is "forward." In the case that FR operation member 86a is set to reverse position and the vehicle is moving in reverse, the second controller 10b determines that the travel status is "reverse."

The work status includes "cargo-loaded," "no-cargo," and "excavation." The second controller 10b determines that the work status is "cargo-loaded" in the case that the lift cylinder hydraulic pressure is equal to or greater than a predetermined cargo-loaded threshold. The second controller 10b determines that the work status is "no-cargo" in the case that the lift cylinder hydraulic pressure is less than the cargo-loaded threshold. In other words, the term "no-cargo" refers to a state in which cargo is not loaded or a small amount of cargo is loaded in the bucket 7. The term "cargo-loaded" refers to a state in which a predetermined amount or more of cargo is loaded in the bucket 7. Therefore, the predetermined load threshold is a value that is greater than the value of the lift cylinder hydraulic pressure in a state in which cargo is not loaded or a small amount of cargo is loaded into the bucket 7, and is the value of the lift cylinder hydraulic pressure in which it can be deemed that cargo is loaded into the bucket 7. The second controller 10b determines the work status to be "excavation" in the case that the lift cylinder hydraulic pressure is equal to or greater than a predetermined excavation hydraulic pressure threshold, the travel status is "forward", and the boom angle is equal to or less than a predetermined excavation angle threshold. The term "excavation" refers to work in which the vehicle drives the bucket 7 into soil and lifts while moving forward. Therefore, the excavation hydraulic pressure corresponds to the value of the lift cylinder hydraulic pressure during excavation work. Also, the excavation angle threshold corresponds to the value of the boom angle during excavation work. The second controller 10*b* discriminates the work phase by a combination of the travel status and the work status. Specifically, the work phase is discriminated in the seven phases of "no-cargo stopped," "cargo-loaded stopped," "no-cargo forward," "cargo-loaded forward," "no-cargo reverse," "cargo-loaded reverse," and "excavation."

In a 2nd-2 step S2-2 and a 2nd-3 step S2-3, it is determined whether the load increase conditions have been satisfied. Specifically, in the 2nd-2 step S2-2, it is determined whether the lift operation amount of the boom operation member 83*a* is greater than a predetermined operation amount threshold Ath and the speed stage of the transmission 26 is second speed. Here, it is determined whether the upward operation amount of the boom operation member 83*a* is greater than the predetermined operation amount threshold Ath on the basis of the detection signals from the boom operation detection device 83*b*. The predetermined operation amount threshold Ath is, e.g., 50%, and is set to a value around which it is predicted that the boom 6 will be moved upward considerably. The operation amount when the boom operation member 83*a* is positioned in the neutral position is 0%, and the operation amount when boom operation member 83*a* has been maximally operated is 100%. It is determined whether the actual speed stage of the transmission 26 is second speed. The process proceeds to 2nd-3 step S2-3 when the above-described conditions are not satisfied.

In the 2nd-3 step S2-3, it is determined whether the work phase is excavation. Here, the determination is made on the basis of the discrimination results of the 2nd-1 step S2-1 described above.

Figure 22:
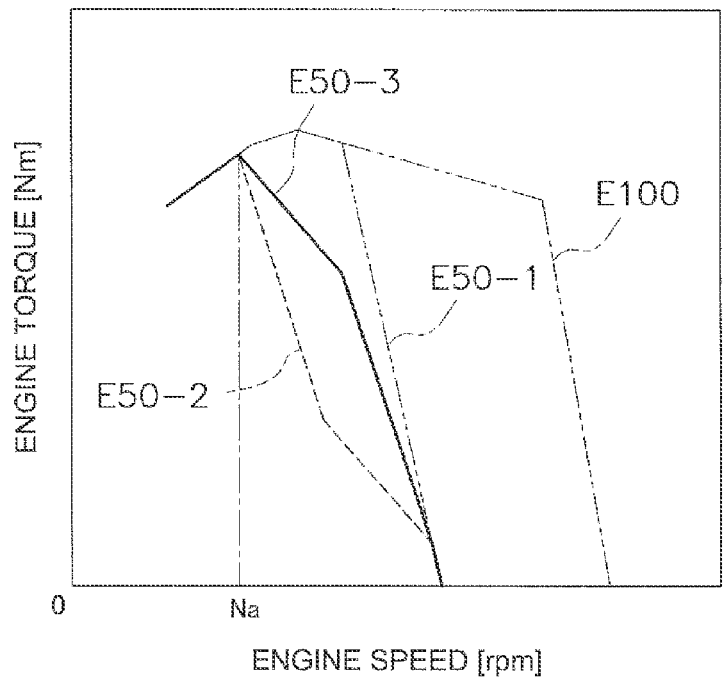
FIG. 22 is a diagram showing examples of the third engine torque curve according to another embodiment.
Figure 23:
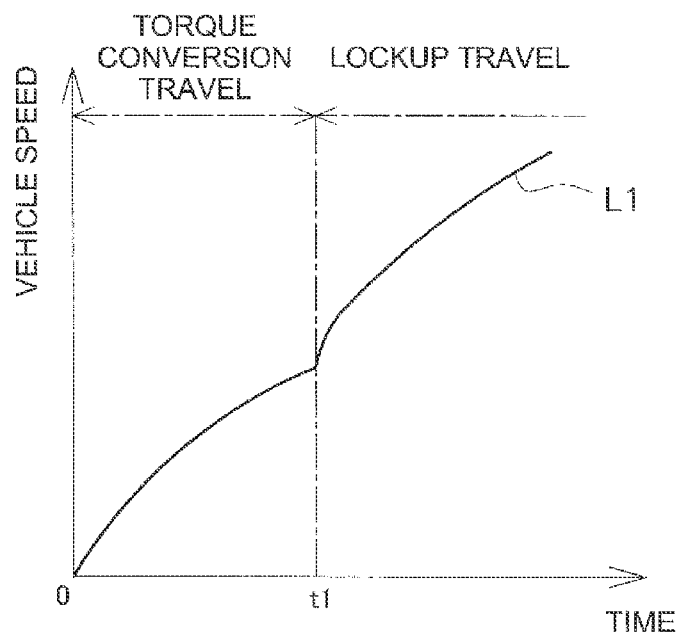
FIG. 23 is a diagram showing the change in vehicle speed when a switch has been made from torque conversion travel to lockup travel in a conventional work vehicle.

The process proceeds to the 2nd-4 step S2-4 in the case that the conditions of either of the 2nd-2 step S2-2 or the 2nd-3 step S2-3 are satisfied. In other words, the process proceeds to the 2nd-4 step S2-4 in the case that the load increase conditions are satisfied. In the 2nd-4 step S2-4, a third engine torque curve is selected as the engine torque curve to be used for controlling the engine 21. The third engine torque curve is an engine torque curve in which the engine torque is greater than the second engine torque curve in at least a portion of the range of the engine speed. Also, the third engine torque curve is an engine torque curve in which the engine torque is less than the first engine torque curve in at least a portion of the range of the engine speed. For example, the third engine torque curve E50-3 has an engine torque that is greater than the second engine torque curve E50-2 in an engine speed range of Na or higher, as shown in FIG. 22. The third engine torque curve E50-3 has an engine torque that is less than the first engine torque curve E50-1 in an engine speed range of Na or higher. The first engine torque curve E50-1 corresponds to the first engine torque curve E50 of FIG. 5 described above. Also, the second engine torque curve E50-2 corresponds to the second engine torque curve E2LU50 of FIG. 5 described above. However, no limitation is imposed by the case in which the accelerator operation amount is 50%, and a third engine torque curve that corresponds to the accelerator operation amounts is set in the case that the accelerator operation amount is another value. Also, no limitation is imposed by the case in which the speed stage of the transmission 26 is second speed, and a third engine torque curve that corresponds to the speed stages is set in the case that another speed stage (e.g., third speed) is used.

The process proceeds to the 2nd-5 step S5 in the case that the conditions of either of the 2nd-2 step S2-2 or the 2nd-3 step S2-3 are not satisfied. In other words, the process proceeds to the 2nd-5 step S2-5 in the case that the load increase conditions are not satisfied. In the 2nd-5 step S2-5, the second engine torque curve is selected as the engine torque curve used for controlling the engine 21.

Next, the torque reduction amount is calculated in the third step S3, as shown in FIG. 20. Here, the second controller 10*b* calculates the torque reduction amount for changing the first engine torque curve described above in the manner of the engine torque curve selected in the 2nd-0 step S2-0. In other words, in the case that the third engine torque curve has been selected in the 2nd-4 step S2-4 of FIG. 21, the second controller 10*b* calculates the torque reduction amount for changing the first engine torque curve described above in the manner of the third engine torque curve. Also, in the case that the second engine torque curve has been selected in the 2nd-5 step S2-5 of FIG. 21, the second controller 10*b* calculates the torque reduction amount for changing the first engine torque curve described above in the manner of the second engine torque curve. The details of the calculation method are the same as those of the third step S3 of FIG. 4 described above. Also, the other processing of FIG. 20 is the same as the processing of the flowchart of FIG. 4.

As described above, in the case that the load of the work implement 3 increases, the third engine torque curve is used, whereby the reduction amount of the engine torque becomes less than when the second engine torque curve is used. In other words, in a situation in which the engine torque is preferably high, the engine torque can be increased more than when the second engine torque curve is used. The ease of operation can thereby be improved. The conditions indicating that the work vehicle is in a situation that leads to an increase in the travel load may be used in addition to the load increase conditions described above or in lieu of the load increase conditions. Situations that lead to an increase in the travel load include, e.g., the case of traveling uphill. In this case, it is possible to determine whether the work vehicle is traveling uphill on the basis of a detection signal from a sensor for detecting the slope angle of the work vehicle 1 (a slope angle detector). Alternatively, it is possible to detect the acceleration of the vehicle speed of the work vehicle 1 and determine whether the work vehicle is traveling uphill on the basis of the acceleration. The engine torque can thereby be more greatly increased than when the second engine torque curve is used in a situation in which the travel load increases. It is possible to improve the travel characteristics as a result.

The third engine torque curve may be the same as the first engine torque curve. In other words, engine torque reduction control is not necessarily required to be performed during lockup travel depending on the condition of the work vehicle 1.

The above described embodiment has an effect that inhibits an increase in vehicle speed immediately after the lockup clutch has been switched from a non-connected state to a connected state, and makes it possible to improve fuel economy. Accordingly, the above described embodiment is effective as a work vehicle and a work vehicle control method.

The invention claimed is:

1. A work vehicle comprising:
an engine;
a travel device configured to cause the work vehicle to travel, the travel device being driven by a drive force from the engine;

a hydraulic pump configured to discharge hydraulic fluid, the hydraulic pump being driven by the drive force from the engine;

a work implement driven by the hydraulic fluid from the hydraulic pump;

a torque converter device configured to transmit the drive force from the engine to the travel device, the torque converter device having a torque converter and a lockup clutch;

an accelerator operation member operated by an operator;

an accelerator operation detector configured to detect an operation amount of the accelerator operation member; and a controller configured to control the engine based on one of at least a first engine torque curve and a second engine torque curve, each of the first and second torque curves defining a relationship between an engine speed, an engine output torque, and the operation amount of the accelerator operation member, the first engine torque curve being different from the second engine torque curve, the controller being further configured to
control the engine based on the first engine torque curve during torque conversion travel in which the lockup clutch is in a non-connected state,
change to controlling the engine based on the second engine torque curve after the controller determines that the lockup clutch has been switched from the non-connected state to a connected state, and the engine output torque of the second engine torque curve being less than the engine output torque of the first engine torque curve at least at a switch speed at which a switch is made from the non-connected state to the connected state of the lockup clutch when the operation amount of the accelerator operation member is a predetermined operation amount that is less than a maximum operation amount.

2. The work vehicle according to claim 1, wherein
the engine output torque of the second engine torque curve increases or decreases in accordance with an increase or decrease in the operation amount of the accelerator operation member in at least a prescribed range of the engine speed.

3. The work vehicle according to claim 1, further comprising
a maximum speed stage setting member operated by the operator, wherein
the travel device has a transmission;
the controller is configured to automatically change gears of the transmission in a range equal to or less than a maximum speed stage selected by the maximum speed stage setting member; and
the controller is configured to control the engine based on different second engine torque curves in a case that the maximum speed stage selected by the maximum speed stage setting member is different, even when an actual speed stage of the transmission is the same speed stage.

4. The work vehicle according to claim 1, wherein
the engine output torque of the second engine torque curve when the operation amount of the accelerator operation member is maximum is less than the engine output torque of the first engine torque curve in at least a prescribed range of the engine speed.

5. The work vehicle according to claim 1, wherein
the controller is configured to determine whether load increase conditions that lead to an increase in work implement load or travel load are satisfied, and to control the engine based on a third engine torque curve in which the engine output torque is greater than the second engine torque curve in at least a prescribed range of the engine speed during the lockup travel when the load increase conditions are satisfied.

6. A method for controlling a work vehicle including an engine, a travel device for causing the work vehicle to travel—and driven by a drive force from the engine, a hydraulic pump for discharging hydraulic fluid—and driven by the drive force from the engine, a work implement driven by hydraulic fluid from the hydraulic pump, a torque converter device for transmitting the drive force from the engine to the travel device and having a torque converter and a lockup clutch, and an accelerator operation member operated by an operator, the method comprising:

detecting an operation amount of the accelerator operation member; and controlling the engine based on one of at least a first engine torque curve and a second engine torque curve, each of the first and second engine torque curves defining a relationship between an engine speed, an engine output torque, and the operation amount of the accelerator operation member, wherein in the controlling of the engine based on the first and second engine torque curves,
the engine is controlled based on the first engine torque curve during torque conversion travel in which the lockup clutch is in a non-connected state,
the controlling of the engine is changed to control based on the second engine torque curve after determining that the lockup clutch has been switched from the disconnected state to a connected state, the engine output torque of the second engine torque curve being less than the engine output torque of the first engine torque curve at least at a switch speed at which a switch is made from the non-connected state to the connected state of the lockup clutch when the operation amount of the accelerator operation member is a predetermined operation amount which is less than a maximum operation amount.

* * * * *